(12) United States Patent
Leonard et al.

(10) Patent No.: US 8,935,631 B2
(45) Date of Patent: Jan. 13, 2015

(54) ARRANGING TILES

(71) Applicant: Microsoft Corporation, Redmond, WA (US)

(72) Inventors: Chantal M. Leonard, Seattle, WA (US); Holger Kuehnle, Seattle, WA (US); John C. Whytock, Portland, OR (US); Rebecca Deutsch, Seattle, WA (US); Patrice L. Miner, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/657,789

(22) Filed: Oct. 22, 2012

(65) Prior Publication Data
US 2013/0057588 A1    Mar. 7, 2013

Related U.S. Application Data

(63) Continuation of application No. 13/224,258, filed on Sep. 1, 2011.

(51) Int. Cl.
*G09G 5/00* (2006.01)
*G06F 3/048* (2013.01)

(52) U.S. Cl.
USPC .......................................... 715/788; 345/660

(58) Field of Classification Search
CPC .................................. G06F 3/048; G09G 5/00
USPC ................................................ 715/788, 769
See application file for complete search history.

(56) References Cited

U.S. PATENT DOCUMENTS

| | | |
|---|---|---|
| 4,823,283 A | 4/1989 | Diehm et al. |
| 5,045,997 A | 9/1991 | Watanabe |
| 5,046,001 A | 9/1991 | Barker et al. |
| 5,189,732 A | 2/1993 | Kondo |
| 5,258,748 A | 11/1993 | Jones |
| 5,297,032 A | 3/1994 | Trojan et al. |
| 5,321,750 A | 6/1994 | Nadan |
| 5,339,392 A | 8/1994 | Risberg et al. |
| 5,432,932 A | 7/1995 | Chen et al. |
| 5,463,725 A | 10/1995 | Henckel et al. |
| 5,485,197 A | 1/1996 | Hoarty |
| 5,495,566 A | 2/1996 | Kwatinetz |
| 5,515,495 A | 5/1996 | Ikemoto |

(Continued)

FOREIGN PATENT DOCUMENTS

| | | |
|---|---|---|
| CN | 1734440 | 2/2006 |
| CN | 1902575 | 1/2007 |

(Continued)

OTHER PUBLICATIONS

Brian Livingston and David Straub, "Windows 95 Secrets", 1995, IDG Books Worldwide, 3rd Edition, p. 121-127.*

(Continued)

*Primary Examiner* — William Bashore
*Assistant Examiner* — Jeanette J Parker
(74) *Attorney, Agent, or Firm* — Bryan Webster; Kate Drakos; Micky Minhas

(57) ABSTRACT

This document describes techniques and apparatuses for arranging tiles. These techniques and apparatuses enable users to quickly and easily arrange tiles within an interface, such as an application-launching interface. In some cases, users may arrange tiles in an interface with as little as one continuous gesture.

20 Claims, 13 Drawing Sheets

(56) References Cited

U.S. PATENT DOCUMENTS

| | | | |
|---|---|---|---|
| 5,574,836 A | 11/1996 | Broemmelsiek | |
| 5,598,523 A | 1/1997 | Fujita | |
| 5,611,060 A * | 3/1997 | Belfiore et al. | 715/819 |
| 5,623,613 A | 4/1997 | Rowe et al. | |
| 5,640,176 A | 6/1997 | Mundt et al. | |
| 5,650,827 A | 7/1997 | Tsumori et al. | |
| 5,657,049 A | 8/1997 | Ludolph et al. | |
| 5,675,329 A | 10/1997 | Barker | |
| 5,687,331 A | 11/1997 | Volk et al. | |
| 5,712,995 A | 1/1998 | Cohn | |
| 5,771,042 A | 6/1998 | Santos-Gomez | |
| 5,793,415 A | 8/1998 | Gregory et al. | |
| 5,819,284 A | 10/1998 | Farber et al. | |
| 5,844,547 A | 12/1998 | Minakuchi et al. | |
| 5,860,073 A | 1/1999 | Ferrel et al. | |
| 5,905,492 A | 5/1999 | Straub et al. | |
| 5,914,720 A | 6/1999 | Maples et al. | |
| 5,940,076 A | 8/1999 | Sommers et al. | |
| 5,959,621 A | 9/1999 | Nawaz et al. | |
| 5,963,204 A | 10/1999 | Ikeda et al. | |
| 6,008,809 A | 12/1999 | Brooks | |
| 6,008,816 A | 12/1999 | Eisler et al. | |
| 6,009,519 A | 12/1999 | Jones et al. | |
| 6,011,542 A | 1/2000 | Durrani et al. | |
| 6,028,600 A | 2/2000 | Rosin et al. | |
| 6,057,839 A | 5/2000 | Advani et al. | |
| 6,064,383 A | 5/2000 | Skelly | |
| 6,104,418 A | 8/2000 | Tanaka et al. | |
| 6,108,003 A | 8/2000 | Hall, Jr. et al. | |
| 6,111,585 A | 8/2000 | Choi | |
| 6,115,040 A | 9/2000 | Bladow et al. | |
| 6,166,736 A | 12/2000 | Hugh | |
| 6,188,405 B1 | 2/2001 | Czerwinski et al. | |
| 6,211,921 B1 | 4/2001 | Cherian et al. | |
| 6,212,564 B1 | 4/2001 | Harter et al. | |
| 6,216,141 B1 | 4/2001 | Straub et al. | |
| 6,266,098 B1 | 7/2001 | Cove et al. | |
| 6,278,448 B1 | 8/2001 | Brown et al. | |
| 6,281,940 B1 | 8/2001 | Sciammarella | |
| 6,311,058 B1 | 10/2001 | Wecker et al. | |
| 6,369,837 B1 | 4/2002 | Schirmer | |
| 6,385,630 B1 | 5/2002 | Ejerhed | |
| 6,396,963 B2 | 5/2002 | Shaffer | |
| 6,411,307 B1 | 6/2002 | Rosin et al. | |
| 6,424,338 B1 | 7/2002 | Anderson et al. | |
| 6,426,753 B1 | 7/2002 | Migdal | |
| 6,433,789 B1 | 8/2002 | Rosman | |
| 6,448,987 B1 | 9/2002 | Easty et al. | |
| 6,449,638 B1 | 9/2002 | Wecker et al. | |
| 6,456,334 B1 | 9/2002 | Duhault | |
| 6,489,977 B2 | 12/2002 | Sone | |
| 6,505,243 B1 | 1/2003 | Lortz | |
| 6,507,643 B1 | 1/2003 | Groner | |
| 6,510,144 B1 | 1/2003 | Dommety et al. | |
| 6,510,466 B1 | 1/2003 | Cox et al. | |
| 6,510,553 B1 | 1/2003 | Hazra | |
| 6,538,635 B1 | 3/2003 | Ringot | |
| 6,570,597 B1 | 5/2003 | Seki et al. | |
| 6,577,323 B1 | 6/2003 | Jamieson et al. | |
| 6,577,350 B1 | 6/2003 | Proehl et al. | |
| 6,591,244 B2 | 7/2003 | Jim et al. | |
| 6,597,374 B1 | 7/2003 | Baker et al. | |
| 6,628,309 B1 * | 9/2003 | Dodson et al. | 715/769 |
| 6,636,246 B1 | 10/2003 | Gallo et al. | |
| 6,662,023 B1 | 12/2003 | Helle | |
| 6,675,387 B1 | 1/2004 | Boucher et al. | |
| 6,690,387 B2 | 2/2004 | Zimmerman et al. | |
| 6,697,825 B1 | 2/2004 | Underwood et al. | |
| 6,707,449 B2 | 3/2004 | Hinckley et al. | |
| 6,710,771 B1 | 3/2004 | Yamaguchi et al. | |
| 6,721,958 B1 | 4/2004 | Dureau | |
| 6,724,403 B1 | 4/2004 | Santoro et al. | |
| 6,784,925 B1 | 8/2004 | Tomat et al. | |
| 6,798,421 B2 | 9/2004 | Baldwin | |
| 6,801,203 B1 | 10/2004 | Hussain | |
| 6,807,558 B1 | 10/2004 | Hassett et al. | |
| 6,832,355 B1 | 12/2004 | Duperrouzel et al. | |
| 6,857,104 B1 | 2/2005 | Cahn | |
| 6,865,297 B2 | 3/2005 | Loui | |
| 6,873,329 B2 | 3/2005 | Cohen et al. | |
| 6,876,312 B2 | 4/2005 | Yu | |
| 6,885,974 B2 | 4/2005 | Holle | |
| 6,904,597 B2 | 6/2005 | Jin | |
| 6,920,445 B2 | 7/2005 | Bae | |
| 6,938,101 B2 | 8/2005 | Hayes et al. | |
| 6,961,731 B2 | 11/2005 | Holbrook | |
| 6,971,067 B1 | 11/2005 | Karson et al. | |
| 6,972,776 B2 | 12/2005 | Davis et al. | |
| 6,975,306 B2 | 12/2005 | Hinckley | |
| 6,976,210 B1 | 12/2005 | Silva et al. | |
| 6,978,303 B1 | 12/2005 | McCreesh et al. | |
| 6,983,310 B2 | 1/2006 | Rouse | |
| 6,987,991 B2 | 1/2006 | Nelson | |
| 7,013,041 B2 | 3/2006 | Miyamoto | |
| 7,017,119 B1 | 3/2006 | Johnston et al. | |
| 7,019,757 B2 | 3/2006 | Brown et al. | |
| 7,028,264 B2 | 4/2006 | Santoro et al. | |
| 7,032,187 B2 | 4/2006 | Keely, Jr. et al. | |
| 7,036,090 B1 | 4/2006 | Nguyen | |
| 7,036,091 B1 | 4/2006 | Nguyen | |
| 7,042,460 B2 | 5/2006 | Hussain et al. | |
| 7,051,291 B2 | 5/2006 | Sciammarella et al. | |
| 7,058,955 B2 | 6/2006 | Porkka | |
| 7,065,385 B2 | 6/2006 | Jarrad et al. | |
| 7,065,386 B1 | 6/2006 | Smethers | |
| 7,075,535 B2 | 7/2006 | Aguera y Arcas | |
| 7,089,507 B2 | 8/2006 | Lection et al. | |
| 7,091,998 B2 | 8/2006 | Miller-Smith | |
| 7,093,201 B2 | 8/2006 | Duarte | |
| 7,106,349 B2 | 9/2006 | Baar et al. | |
| 7,111,044 B2 | 9/2006 | Lee | |
| 7,133,707 B1 | 11/2006 | Rak | |
| 7,133,859 B1 | 11/2006 | Wong | |
| 7,139,800 B2 | 11/2006 | Bellotti et al. | |
| 7,146,573 B2 | 12/2006 | Brown et al. | |
| 7,155,729 B1 | 12/2006 | Andrew et al. | |
| 7,158,123 B2 | 1/2007 | Myers et al. | |
| 7,158,135 B2 | 1/2007 | Santodomingo et al. | |
| 7,178,111 B2 | 2/2007 | Glein et al. | |
| 7,180,527 B2 | 2/2007 | Sakai et al. | |
| 7,194,506 B1 | 3/2007 | White et al. | |
| 7,210,099 B2 | 4/2007 | Rohrabaugh et al. | |
| 7,216,588 B2 | 5/2007 | Suess | |
| 7,249,326 B2 | 7/2007 | Stoakley et al. | |
| 7,262,775 B2 | 8/2007 | Calkins et al. | |
| 7,263,668 B1 | 8/2007 | Lentz | |
| 7,280,097 B2 | 10/2007 | Chen | |
| 7,283,620 B2 | 10/2007 | Adamczyk | |
| 7,289,806 B2 | 10/2007 | Morris et al. | |
| 7,296,184 B2 | 11/2007 | Derks et al. | |
| 7,296,242 B2 | 11/2007 | Agata et al. | |
| 7,310,100 B2 | 12/2007 | Hussain | |
| 7,333,092 B2 | 2/2008 | Zadesky et al. | |
| 7,333,120 B2 | 2/2008 | Venolia | |
| 7,336,263 B2 | 2/2008 | Valikangas | |
| 7,369,647 B2 | 5/2008 | Gao et al. | |
| 7,376,907 B2 | 5/2008 | Santoro et al. | |
| 7,386,807 B2 | 6/2008 | Cummins et al. | |
| 7,388,578 B2 | 6/2008 | Tao | |
| 7,403,191 B2 | 7/2008 | Sinclair | |
| 7,408,538 B2 | 8/2008 | Hinckley et al. | |
| 7,412,663 B2 | 8/2008 | Lindsay et al. | |
| 7,433,920 B2 | 10/2008 | Blagsvedt et al. | |
| 7,447,520 B2 | 11/2008 | Scott | |
| 7,461,151 B2 | 12/2008 | Colson et al. | |
| 7,469,380 B2 | 12/2008 | Wessling et al. | |
| 7,469,381 B2 | 12/2008 | Ording | |
| 7,478,326 B2 | 1/2009 | Holecek et al. | |
| 7,479,949 B2 | 1/2009 | Jobs | |
| 7,480,870 B2 | 1/2009 | Anzures | |
| 7,483,418 B2 | 1/2009 | Maurer | |
| 7,487,467 B1 | 2/2009 | Kawahara et al. | |
| 7,496,830 B2 | 2/2009 | Rubin | |
| 7,500,175 B2 | 3/2009 | Colle et al. | |

(56) References Cited

U.S. PATENT DOCUMENTS

| | | | |
|---|---|---|---|
| 7,512,966 B2 | 3/2009 | Lyons, Jr. et al. |
| 7,577,918 B2 | 8/2009 | Lindsay |
| 7,581,034 B2 | 8/2009 | Polivy et al. |
| 7,593,995 B1 | 9/2009 | He et al. |
| 7,595,810 B2 | 9/2009 | Louch |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,106 B2 | 10/2009 | Ernst et al. |
| 7,610,563 B2 | 10/2009 | Nelson et al. |
| 7,619,615 B1 | 11/2009 | Donoghue |
| 7,640,518 B2 | 12/2009 | Forlines et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,664,067 B2 | 2/2010 | Pointer |
| 7,671,756 B2 | 3/2010 | Herz et al. |
| 7,702,683 B1 | 4/2010 | Kirshenbaum |
| 7,755,674 B2 | 7/2010 | Kaminaga |
| 7,834,861 B2 | 11/2010 | Lee |
| 7,844,915 B2 | 11/2010 | Platzer et al. |
| 7,877,707 B2 | 1/2011 | Westerman et al. |
| 7,880,728 B2 | 2/2011 | De Los Reyes et al. |
| 7,889,180 B2 | 2/2011 | Byun et al. |
| 7,895,309 B2 | 2/2011 | Belali et al. |
| 7,903,115 B2 | 3/2011 | Platzer et al. |
| 7,924,271 B2 | 4/2011 | Christie et al. |
| 7,933,632 B2 | 4/2011 | Flynt et al. |
| 7,962,281 B2 | 6/2011 | Rasmussen et al. |
| 7,983,718 B1 | 7/2011 | Roka |
| 7,987,431 B2 | 7/2011 | Santoro et al. |
| 8,006,276 B2 | 8/2011 | Nakagawa et al. |
| 8,086,275 B2 | 12/2011 | Wykes |
| 8,108,781 B2 | 1/2012 | Laansoo et al. |
| 8,131,808 B2 | 3/2012 | Aoki et al. |
| 8,150,924 B2 | 4/2012 | Buchheit et al. |
| 8,171,431 B2 | 5/2012 | Grossman et al. |
| 8,175,653 B2 | 5/2012 | Smuga |
| 8,176,438 B2 | 5/2012 | Zaman et al. |
| 8,209,623 B2 | 6/2012 | Barletta et al. |
| 8,225,193 B1 | 7/2012 | Kleinschnitz et al. |
| 8,238,876 B2 | 8/2012 | Teng |
| 8,245,152 B2 | 8/2012 | Brunner et al. |
| 8,250,494 B2 | 8/2012 | Butcher |
| 8,255,473 B2 | 8/2012 | Eren et al. |
| 8,255,812 B1 | 8/2012 | Parparita et al. |
| 8,269,736 B2 | 9/2012 | Wilairat |
| 8,307,279 B1 | 11/2012 | Fioravanti et al. |
| 8,384,726 B1 | 2/2013 | Grabowski et al. |
| 8,429,565 B2 | 4/2013 | Agarawala et al. |
| 8,448,083 B1 | 5/2013 | Migos et al. |
| 8,473,870 B2 | 6/2013 | Hinckley et al. |
| 8,493,510 B2 | 7/2013 | Bryan et al. |
| 8,525,808 B1 | 9/2013 | Buening |
| 8,539,384 B2 | 9/2013 | Hinckley et al. |
| 8,548,431 B2 | 10/2013 | Teng et al. |
| 8,560,959 B2 | 10/2013 | Zaman et al. |
| 8,589,815 B2 | 11/2013 | Fong et al. |
| 8,612,874 B2 | 12/2013 | Zaman et al. |
| 8,627,227 B2 | 1/2014 | Matthews et al. |
| 8,665,272 B2 | 3/2014 | Fitzmaurice et al. |
| 8,669,950 B2 | 3/2014 | Forstall et al. |
| 8,687,023 B2 | 4/2014 | Markiewicz et al. |
| 8,689,123 B2 | 4/2014 | Zaman et al. |
| 8,706,515 B2 | 4/2014 | Cobbs et al. |
| 8,830,270 B2 | 9/2014 | Zaman et al. |
| 8,893,033 B2 | 11/2014 | Donahue et al. |
| 2001/0022621 A1 | 9/2001 | Squibbs |
| 2002/0000963 A1 | 1/2002 | Yoshida et al. |
| 2002/0018051 A1 | 2/2002 | Singh |
| 2002/0035607 A1 | 3/2002 | Checkoway et al. |
| 2002/0054117 A1 | 5/2002 | van Dantzich et al. |
| 2002/0060701 A1 | 5/2002 | Naughton et al. |
| 2002/0070961 A1 | 6/2002 | Xu et al. |
| 2002/0077156 A1 | 6/2002 | Smethers |
| 2002/0091755 A1 | 7/2002 | Narin |
| 2002/0097264 A1 | 7/2002 | Dutta et al. |
| 2002/0105531 A1 | 8/2002 | Niemi |
| 2002/0115476 A1 | 8/2002 | Padawer et al. |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0145631 A1 | 10/2002 | Arbab et al. |
| 2002/0149622 A1 | 10/2002 | Uesaki et al. |
| 2002/0152305 A1 | 10/2002 | Jackson et al. |
| 2002/0154176 A1 | 10/2002 | Barksdale et al. |
| 2002/0161634 A1 | 10/2002 | Kaars |
| 2002/0186251 A1 | 12/2002 | Himmel et al. |
| 2002/0194385 A1 | 12/2002 | Linder et al. |
| 2003/0003899 A1 | 1/2003 | Tashiro et al. |
| 2003/0008686 A1 | 1/2003 | Park et al. |
| 2003/0011643 A1 | 1/2003 | Nishihihata |
| 2003/0020671 A1* | 1/2003 | Santoro et al. ............. 345/1.3 |
| 2003/0040300 A1 | 2/2003 | Bodic |
| 2003/0046396 A1 | 3/2003 | Richter et al. |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2004/0066414 A1 | 4/2004 | Czerwinski et al. |
| 2004/0068543 A1 | 4/2004 | Seifert |
| 2004/0078299 A1 | 4/2004 | Down-Logan |
| 2004/0111673 A1 | 6/2004 | Bowman et al. |
| 2004/0185883 A1 | 9/2004 | Rukman |
| 2004/0212586 A1 | 10/2004 | Denny |
| 2004/0217954 A1 | 11/2004 | O'Gorman et al. |
| 2004/0217980 A1 | 11/2004 | Radburn et al. |
| 2004/0237048 A1 | 11/2004 | Tojo et al. |
| 2004/0250217 A1 | 12/2004 | Tojo et al. |
| 2004/0266491 A1 | 12/2004 | Howard et al. |
| 2005/0005241 A1 | 1/2005 | Hunleth et al. |
| 2005/0028208 A1 | 2/2005 | Ellis et al. |
| 2005/0044058 A1 | 2/2005 | Matthews et al. |
| 2005/0054384 A1 | 3/2005 | Pasquale et al. |
| 2005/0060647 A1 | 3/2005 | Doan et al. |
| 2005/0060665 A1 | 3/2005 | Rekimoto |
| 2005/0079896 A1 | 4/2005 | Kokko et al. |
| 2005/0085215 A1 | 4/2005 | Kokko |
| 2005/0085272 A1 | 4/2005 | Anderson et al. |
| 2005/0108655 A1 | 5/2005 | Andrea et al. |
| 2005/0114788 A1 | 5/2005 | Fabritius |
| 2005/0120306 A1 | 6/2005 | Klassen et al. |
| 2005/0143138 A1 | 6/2005 | Lee et al. |
| 2005/0149879 A1 | 7/2005 | Jobs et al. |
| 2005/0156947 A1 | 7/2005 | Sakai et al. |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0198159 A1 | 9/2005 | Kirsch |
| 2005/0198584 A1 | 9/2005 | Matthews et al. |
| 2005/0200762 A1 | 9/2005 | Barletta et al. |
| 2005/0216300 A1 | 9/2005 | Appelman et al. |
| 2005/0223057 A1 | 10/2005 | Buchheit et al. |
| 2005/0223069 A1 | 10/2005 | Cooperman et al. |
| 2005/0232166 A1 | 10/2005 | Nierhaus |
| 2005/0250547 A1 | 11/2005 | Salman et al. |
| 2005/0268237 A1 | 12/2005 | Crane et al. |
| 2005/0273614 A1 | 12/2005 | Ahuja |
| 2005/0280719 A1 | 12/2005 | Kim |
| 2006/0004685 A1 | 1/2006 | Pyhalammi et al. |
| 2006/0010394 A1 | 1/2006 | Chaudhri et al. |
| 2006/0015736 A1 | 1/2006 | Callas et al. |
| 2006/0015812 A1 | 1/2006 | Cunningham et al. |
| 2006/0026013 A1 | 2/2006 | Kraft |
| 2006/0026521 A1 | 2/2006 | Hotelling et al. |
| 2006/0036425 A1 | 2/2006 | Le Cocq et al. |
| 2006/0048073 A1 | 3/2006 | Jarrett et al. |
| 2006/0048101 A1 | 3/2006 | Krassovsky et al. |
| 2006/0059430 A1 | 3/2006 | Bells |

(56) References Cited

U.S. PATENT DOCUMENTS

| | | |
|---|---|---|
| 2006/0061597 A1 | 3/2006 | Hui |
| 2006/0070005 A1 | 3/2006 | Gilbert et al. |
| 2006/0074735 A1 | 4/2006 | Shukla et al. |
| 2006/0074771 A1 | 4/2006 | Kim |
| 2006/0075360 A1 | 4/2006 | Bixler |
| 2006/0103623 A1 | 5/2006 | Davis |
| 2006/0107231 A1 | 5/2006 | Matthews et al. |
| 2006/0112354 A1 | 5/2006 | Park et al. |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0172724 A1 | 8/2006 | Linkert et al. |
| 2006/0173911 A1 | 8/2006 | Levin et al. |
| 2006/0184901 A1 | 8/2006 | Dietz |
| 2006/0190833 A1 | 8/2006 | SanGiovanni et al. |
| 2006/0199598 A1 | 9/2006 | Lee et al. |
| 2006/0212806 A1 | 9/2006 | Griffin et al. |
| 2006/0218234 A1 | 9/2006 | Deng et al. |
| 2006/0218501 A1 | 9/2006 | Wilson et al. |
| 2006/0224993 A1 | 10/2006 | Wong et al. |
| 2006/0246955 A1 | 11/2006 | Nirhamo |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0262134 A1 | 11/2006 | Hamiter et al. |
| 2006/0268100 A1 | 11/2006 | Karukka et al. |
| 2006/0271520 A1 | 11/2006 | Ragan |
| 2006/0281448 A1 | 12/2006 | Plestid et al. |
| 2006/0293088 A1 | 12/2006 | Kokubo |
| 2006/0294063 A1 | 12/2006 | Ali et al. |
| 2006/0294396 A1 | 12/2006 | Witman |
| 2007/0005716 A1 | 1/2007 | LeVasseur et al. |
| 2007/0006094 A1 | 1/2007 | Canfield et al. |
| 2007/0011610 A1 | 1/2007 | Sethi et al. |
| 2007/0015532 A1 | 1/2007 | Deelman |
| 2007/0024646 A1 | 2/2007 | Saarinen et al. |
| 2007/0035513 A1 | 2/2007 | Sherrard et al. |
| 2007/0038567 A1 | 2/2007 | Allaire et al. |
| 2007/0050724 A1 | 3/2007 | Lee et al. |
| 2007/0054679 A1 | 3/2007 | Cho et al. |
| 2007/0061488 A1 | 3/2007 | Alagappan et al. |
| 2007/0061714 A1 | 3/2007 | Stuple et al. |
| 2007/0063995 A1 | 3/2007 | Bailey et al. |
| 2007/0067272 A1 | 3/2007 | Flynt |
| 2007/0067737 A1 | 3/2007 | Zielinski et al. |
| 2007/0073718 A1 | 3/2007 | Ramer |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0083746 A1 | 4/2007 | Fallon et al. |
| 2007/0083821 A1 | 4/2007 | Garbow et al. |
| 2007/0094045 A1 | 4/2007 | Cobbs et al. |
| 2007/0106635 A1 | 5/2007 | Frieden et al. |
| 2007/0120835 A1 | 5/2007 | Sato |
| 2007/0127638 A1 | 6/2007 | Doulton |
| 2007/0157089 A1 | 7/2007 | Van Os et al. |
| 2007/0171192 A1 | 7/2007 | Seo et al. |
| 2007/0180381 A1 | 8/2007 | Rice |
| 2007/0182595 A1 | 8/2007 | Ghasabian |
| 2007/0182999 A1 | 8/2007 | Anthony et al. |
| 2007/0185847 A1 | 8/2007 | Budzik et al. |
| 2007/0192707 A1 | 8/2007 | Maeda et al. |
| 2007/0192730 A1 | 8/2007 | Simila et al. |
| 2007/0192733 A1 | 8/2007 | Horiuchi |
| 2007/0192739 A1 | 8/2007 | Hunleth et al. |
| 2007/0197196 A1 | 8/2007 | Shenfield et al. |
| 2007/0198420 A1 | 8/2007 | Goldstein |
| 2007/0208840 A1 | 9/2007 | Mcconville et al. |
| 2007/0211034 A1 | 9/2007 | Griffin et al. |
| 2007/0214429 A1 | 9/2007 | Lyudovyk et al. |
| 2007/0216651 A1 | 9/2007 | Patel |
| 2007/0216661 A1 | 9/2007 | Chen et al. |
| 2007/0225022 A1 | 9/2007 | Satake |
| 2007/0233654 A1 | 10/2007 | Karlson |
| 2007/0236468 A1 | 10/2007 | Tuli |
| 2007/0238488 A1 | 10/2007 | Scott |
| 2007/0247435 A1 | 10/2007 | Benko et al. |
| 2007/0250583 A1 | 10/2007 | Hardy |
| 2007/0250787 A1 | 10/2007 | Kawahara et al. |
| 2007/0253758 A1 | 11/2007 | Suess |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0260674 A1 | 11/2007 | Shenfield |
| 2007/0262964 A1 | 11/2007 | Zotov et al. |
| 2007/0263843 A1 | 11/2007 | Foxenland |
| 2007/0273663 A1 | 11/2007 | Park et al. |
| 2007/0273668 A1 | 11/2007 | Park et al. |
| 2007/0280457 A1 | 12/2007 | Aberethy et al. |
| 2007/0281747 A1 | 12/2007 | Pletikosa |
| 2008/0005668 A1 | 1/2008 | Mavinkurve |
| 2008/0028294 A1 | 1/2008 | Sell et al. |
| 2008/0032681 A1 | 2/2008 | West |
| 2008/0036743 A1 | 2/2008 | Westerman |
| 2008/0040692 A1 | 2/2008 | Sunday et al. |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0065607 A1 | 3/2008 | Weber |
| 2008/0072173 A1 | 3/2008 | Brunner et al. |
| 2008/0076472 A1 | 3/2008 | Hyatt |
| 2008/0082911 A1 | 4/2008 | Sorotokin et al. |
| 2008/0082934 A1 | 4/2008 | Kocienda et al. |
| 2008/0085700 A1 | 4/2008 | Arora |
| 2008/0092054 A1 | 4/2008 | Bhumkar et al. |
| 2008/0094368 A1 | 4/2008 | Ording et al. |
| 2008/0095100 A1 | 4/2008 | Cleveland et al. |
| 2008/0102863 A1 | 5/2008 | Hardy et al. |
| 2008/0104544 A1 | 5/2008 | Collins et al. |
| 2008/0107057 A1 | 5/2008 | Kannan et al. |
| 2008/0113656 A1 | 5/2008 | Lee et al. |
| 2008/0114535 A1 | 5/2008 | Nesbitt |
| 2008/0122796 A1 | 5/2008 | Jobs |
| 2008/0132252 A1 | 6/2008 | Altman et al. |
| 2008/0138030 A1 | 6/2008 | Bryan et al. |
| 2008/0141153 A1 | 6/2008 | Samson et al. |
| 2008/0153551 A1 | 6/2008 | Baek et al. |
| 2008/0155425 A1 | 6/2008 | Murthy et al. |
| 2008/0162651 A1 | 7/2008 | Madnani |
| 2008/0163104 A1 | 7/2008 | Haug |
| 2008/0165132 A1 | 7/2008 | Weiss |
| 2008/0165136 A1 | 7/2008 | Christie et al. |
| 2008/0165141 A1 | 7/2008 | Christie |
| 2008/0165163 A1 | 7/2008 | Bathiche |
| 2008/0165210 A1 | 7/2008 | Platzer et al. |
| 2008/0167058 A1 | 7/2008 | Lee et al. |
| 2008/0168349 A1 | 7/2008 | Lamiraux et al. |
| 2008/0168379 A1 | 7/2008 | Forstall et al. |
| 2008/0168382 A1 | 7/2008 | Louch et al. |
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0174570 A1 | 7/2008 | Jobs et al. |
| 2008/0180399 A1 | 7/2008 | Cheng |
| 2008/0182628 A1 | 7/2008 | Lee et al. |
| 2008/0184112 A1* | 7/2008 | Chiang et al. ............... 715/700 |
| 2008/0189653 A1 | 8/2008 | Taylor et al. |
| 2008/0189658 A1 | 8/2008 | Jeong et al. |
| 2008/0192056 A1 | 8/2008 | Robertson et al. |
| 2008/0198141 A1 | 8/2008 | Lee et al. |
| 2008/0200142 A1 | 8/2008 | Abdel-Kader et al. |
| 2008/0208973 A1 | 8/2008 | Hayashi et al. |
| 2008/0222273 A1 | 9/2008 | Lakshmanan et al. |
| 2008/0222545 A1 | 9/2008 | Lemay et al. |
| 2008/0222547 A1* | 9/2008 | Wong et al. ............... 715/769 |
| 2008/0222560 A1 | 9/2008 | Harrison |
| 2008/0222569 A1 | 9/2008 | Champion |
| 2008/0225014 A1 | 9/2008 | Kim |
| 2008/0242362 A1 | 10/2008 | Duarte |
| 2008/0259042 A1 | 10/2008 | Thorn |
| 2008/0261513 A1 | 10/2008 | Shin et al. |

(56) References Cited

U.S. PATENT DOCUMENTS

| | | |
|---|---|---|
| 2008/0261660 A1 | 10/2008 | Huh et al. |
| 2008/0263457 A1 | 10/2008 | Kim et al. |
| 2008/0270558 A1 | 10/2008 | Ma |
| 2008/0297475 A1 | 12/2008 | Woolf et al. |
| 2008/0299999 A1 | 12/2008 | Lockhart et al. |
| 2008/0301046 A1 | 12/2008 | Martinez et al. |
| 2008/0301575 A1 | 12/2008 | Fermon |
| 2008/0307351 A1 | 12/2008 | Louch et al. |
| 2008/0309626 A1 | 12/2008 | Westerman et al. |
| 2008/0313540 A1 | 12/2008 | Dirks et al. |
| 2008/0316177 A1 | 12/2008 | Tseng |
| 2008/0317240 A1 | 12/2008 | Chang et al. |
| 2008/0320413 A1* | 12/2008 | Oshiro et al. ............... 715/792 |
| 2009/0007009 A1 | 1/2009 | Luneau et al. |
| 2009/0007017 A1 | 1/2009 | Anzures et al. |
| 2009/0012952 A1 | 1/2009 | Fredriksson |
| 2009/0029736 A1 | 1/2009 | Kim et al. |
| 2009/0031247 A1 | 1/2009 | Walter et al. |
| 2009/0037469 A1 | 2/2009 | Kirsch |
| 2009/0037846 A1 | 2/2009 | Spalink et al. |
| 2009/0051671 A1 | 2/2009 | Konstas |
| 2009/0061837 A1 | 3/2009 | Chaudhri et al. |
| 2009/0061948 A1 | 3/2009 | Lee et al. |
| 2009/0064055 A1 | 3/2009 | Chaudhri et al. |
| 2009/0070673 A1 | 3/2009 | Barkan et al. |
| 2009/0077649 A1 | 3/2009 | Lockhart et al. |
| 2009/0079740 A1 | 3/2009 | Fitzmaurice et al. |
| 2009/0083656 A1 | 3/2009 | Dukhon et al. |
| 2009/0085851 A1 | 4/2009 | Lim et al. |
| 2009/0085878 A1 | 4/2009 | Heubel et al. |
| 2009/0089215 A1 | 4/2009 | Newton |
| 2009/0089459 A1 | 4/2009 | Jeyaseelan et al. |
| 2009/0089704 A1 | 4/2009 | Makela |
| 2009/0094562 A1 | 4/2009 | Jeong et al. |
| 2009/0103515 A1 | 4/2009 | Pointer |
| 2009/0106696 A1 | 4/2009 | Duarte |
| 2009/0109243 A1 | 4/2009 | Kraft |
| 2009/0117942 A1 | 5/2009 | Boningue et al. |
| 2009/0125844 A1 | 5/2009 | Weir et al. |
| 2009/0140061 A1 | 6/2009 | Schultz et al. |
| 2009/0140986 A1 | 6/2009 | Karkkainen et al. |
| 2009/0144642 A1 | 6/2009 | Crystal |
| 2009/0144653 A1 | 6/2009 | Ubillos |
| 2009/0144753 A1 | 6/2009 | Morris |
| 2009/0146962 A1 | 6/2009 | Ahonen et al. |
| 2009/0153492 A1 | 6/2009 | Popp |
| 2009/0160809 A1 | 6/2009 | Yang |
| 2009/0163182 A1 | 6/2009 | Gatti et al. |
| 2009/0164888 A1 | 6/2009 | Phan |
| 2009/0164928 A1 | 6/2009 | Brown et al. |
| 2009/0164936 A1 | 6/2009 | Kawaguchi |
| 2009/0178007 A1 | 7/2009 | Matas et al. |
| 2009/0182788 A1 | 7/2009 | Chung et al. |
| 2009/0184939 A1 | 7/2009 | Wohlstadter et al. |
| 2009/0199122 A1 | 8/2009 | Deutsch et al. |
| 2009/0199128 A1 | 8/2009 | Matthews et al. |
| 2009/0199130 A1 | 8/2009 | Tsern et al. |
| 2009/0205041 A1 | 8/2009 | Michalske |
| 2009/0215504 A1 | 8/2009 | Lando |
| 2009/0225038 A1 | 9/2009 | Bolsinga et al. |
| 2009/0228825 A1 | 9/2009 | Van Os et al. |
| 2009/0228841 A1 | 9/2009 | Hildreth |
| 2009/0235200 A1 | 9/2009 | Deutsch et al. |
| 2009/0235203 A1 | 9/2009 | Iizuka |
| 2009/0248421 A1 | 10/2009 | Michaelis et al. |
| 2009/0249257 A1 | 10/2009 | Bove et al. |
| 2009/0265662 A1 | 10/2009 | Bamford |
| 2009/0271778 A1 | 10/2009 | Mandyam et al. |
| 2009/0284482 A1 | 11/2009 | Chin |
| 2009/0284657 A1 | 11/2009 | Roberts et al. |
| 2009/0288044 A1* | 11/2009 | Matthews et al. ............. 715/863 |
| 2009/0292989 A1 | 11/2009 | Matthews et al. |
| 2009/0293007 A1 | 11/2009 | Duarte et al. |
| 2009/0298547 A1 | 12/2009 | Kim et al. |
| 2009/0303231 A1 | 12/2009 | Robinet et al. |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315839 A1 | 12/2009 | Wilson et al. |
| 2009/0315847 A1 | 12/2009 | Fujii |
| 2009/0322760 A1 | 12/2009 | Kwiatkowski et al. |
| 2009/0327969 A1 | 12/2009 | Estrada |
| 2010/0008490 A1 | 1/2010 | Gharachorloo et al. |
| 2010/0013782 A1 | 1/2010 | Liu et al. |
| 2010/0020025 A1 | 1/2010 | Lemort et al. |
| 2010/0020091 A1 | 1/2010 | Rasmussen et al. |
| 2010/0031186 A1 | 2/2010 | Tseng et al. |
| 2010/0042911 A1 | 2/2010 | Wormald et al. |
| 2010/0050076 A1 | 2/2010 | Roth |
| 2010/0057566 A1 | 3/2010 | Itzhak |
| 2010/0058248 A1 | 3/2010 | Park |
| 2010/0066698 A1 | 3/2010 | Seo |
| 2010/0070931 A1 | 3/2010 | Nichols |
| 2010/0073380 A1 | 3/2010 | Kaplan et al. |
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1* | 3/2010 | Kaplan et al. ............... 715/764 |
| 2010/0079392 A1 | 4/2010 | Chiang et al. |
| 2010/0079413 A1 | 4/2010 | Kawashima et al. |
| 2010/0081475 A1 | 4/2010 | Chiang et al. |
| 2010/0086022 A1 | 4/2010 | Hunleth et al. |
| 2010/0087169 A1 | 4/2010 | Lin |
| 2010/0087173 A1 | 4/2010 | Lin |
| 2010/0088635 A1 | 4/2010 | Louch |
| 2010/0100839 A1 | 4/2010 | Tseng et al. |
| 2010/0102998 A1 | 4/2010 | Fux |
| 2010/0103118 A1 | 4/2010 | Townsend et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0106915 A1 | 4/2010 | Krishnaprasad et al. |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0122110 A1 | 5/2010 | Ordogh |
| 2010/0123737 A1 | 5/2010 | Williamson et al. |
| 2010/0138767 A1 | 6/2010 | Wang et al. |
| 2010/0145675 A1 | 6/2010 | Lloyd et al. |
| 2010/0146437 A1 | 6/2010 | Woodcock et al. |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0167699 A1 | 7/2010 | Sigmund et al. |
| 2010/0169766 A1 | 7/2010 | Duarte et al. |
| 2010/0169772 A1 | 7/2010 | Stallings et al. |
| 2010/0169819 A1 | 7/2010 | Bestle et al. |
| 2010/0175018 A1 | 7/2010 | Petschnigg et al. |
| 2010/0175029 A1 | 7/2010 | Williams |
| 2010/0180233 A1 | 7/2010 | Kruzeniski |
| 2010/0185932 A1 | 7/2010 | Coffman et al. |
| 2010/0216491 A1 | 8/2010 | Winkler et al. |
| 2010/0223569 A1 | 9/2010 | Vuong et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0248788 A1 | 9/2010 | Yook et al. |
| 2010/0251153 A1 | 9/2010 | SanGiovanni et al. |
| 2010/0265196 A1 | 10/2010 | Lee et al. |
| 2010/0281402 A1 | 11/2010 | Staikos et al. |
| 2010/0281409 A1 | 11/2010 | Rainisto et al. |
| 2010/0283743 A1 | 11/2010 | Coddington |
| 2010/0289806 A1 | 11/2010 | Lao et al. |
| 2010/0293056 A1 | 11/2010 | Flynt et al. |
| 2010/0295795 A1 | 11/2010 | Wilairat |
| 2010/0298034 A1 | 11/2010 | Shin et al. |

(56) References Cited

U.S. PATENT DOCUMENTS

| | | | |
|---|---|---|---|
| 2010/0302172 A1 | 12/2010 | Wilairat | |
| 2010/0302176 A1 | 12/2010 | Nikula et al. | |
| 2010/0302278 A1 | 12/2010 | Shaffer et al. | |
| 2010/0311470 A1 | 12/2010 | Seo et al. | |
| 2010/0313165 A1 | 12/2010 | Louch et al. | |
| 2010/0321403 A1 | 12/2010 | Inadome | |
| 2010/0328431 A1 | 12/2010 | Kim et al. | |
| 2010/0329642 A1 | 12/2010 | Kam et al. | |
| 2010/0333008 A1* | 12/2010 | Taylor | 715/769 |
| 2011/0004839 A1 | 1/2011 | Cha et al. | |
| 2011/0004845 A1 | 1/2011 | Ciabarra | |
| 2011/0018806 A1 | 1/2011 | Yano | |
| 2011/0029598 A1 | 2/2011 | Arnold et al. | |
| 2011/0029904 A1 | 2/2011 | Smith et al. | |
| 2011/0029927 A1 | 2/2011 | Lietzke et al. | |
| 2011/0029934 A1 | 2/2011 | Locker et al. | |
| 2011/0035702 A1 | 2/2011 | Williams et al. | |
| 2011/0043527 A1 | 2/2011 | Ording et al. | |
| 2011/0055773 A1 | 3/2011 | Agarawala et al. | |
| 2011/0074699 A1 | 3/2011 | Marr et al. | |
| 2011/0074710 A1 | 3/2011 | Weeldreyer et al. | |
| 2011/0074719 A1 | 3/2011 | Yeh et al. | |
| 2011/0087988 A1 | 4/2011 | Ray et al. | |
| 2011/0093778 A1 | 4/2011 | Kim et al. | |
| 2011/0093815 A1 | 4/2011 | Gobeil | |
| 2011/0093816 A1 | 4/2011 | Chang et al. | |
| 2011/0093821 A1 | 4/2011 | Wigdor et al. | |
| 2011/0107272 A1 | 5/2011 | Aguilar | |
| 2011/0113337 A1 | 5/2011 | Liu et al. | |
| 2011/0113486 A1 | 5/2011 | Hunt et al. | |
| 2011/0119586 A1 | 5/2011 | Blinnikka et al. | |
| 2011/0126156 A1 | 5/2011 | Krishnaraj et al. | |
| 2011/0138313 A1 | 6/2011 | Decker et al. | |
| 2011/0154235 A1 | 6/2011 | Min et al. | |
| 2011/0157027 A1 | 6/2011 | Rissa | |
| 2011/0161845 A1 | 6/2011 | Stallings et al. | |
| 2011/0163968 A1 | 7/2011 | Hogan | |
| 2011/0173556 A1 | 7/2011 | Czerwinski et al. | |
| 2011/0173568 A1 | 7/2011 | Royal, Jr. et al. | |
| 2011/0173569 A1 | 7/2011 | Howes et al. | |
| 2011/0175930 A1 | 7/2011 | Hwang et al. | |
| 2011/0202866 A1 | 8/2011 | Huang et al. | |
| 2011/0209039 A1 | 8/2011 | Hinckley et al. | |
| 2011/0209089 A1 | 8/2011 | Hinckley et al. | |
| 2011/0209100 A1 | 8/2011 | Hinckley et al. | |
| 2011/0209101 A1 | 8/2011 | Hinckley et al. | |
| 2011/0209102 A1 | 8/2011 | Hinckley et al. | |
| 2011/0209103 A1 | 8/2011 | Hinckley et al. | |
| 2011/0209104 A1 | 8/2011 | Hinckley et al. | |
| 2011/0225547 A1 | 9/2011 | Fong et al. | |
| 2011/0231796 A1 | 9/2011 | Vigil | |
| 2011/0252346 A1 | 10/2011 | Chaudhri | |
| 2011/0252380 A1 | 10/2011 | Chaudhri | |
| 2011/0276864 A1 | 11/2011 | Oules | |
| 2011/0283188 A1 | 11/2011 | Farrenkopf et al. | |
| 2011/0316884 A1 | 12/2011 | Giambalvo et al. | |
| 2012/0005584 A1 | 1/2012 | Seago et al. | |
| 2012/0009903 A1 | 1/2012 | Schultz et al. | |
| 2012/0028687 A1 | 2/2012 | Wykes | |
| 2012/0050185 A1 | 3/2012 | Davydov et al. | |
| 2012/0050332 A1 | 3/2012 | Nikara et al. | |
| 2012/0081310 A1 | 4/2012 | Schrock et al. | |
| 2012/0089950 A1 | 4/2012 | Tseng | |
| 2012/0102433 A1 | 4/2012 | Falkenburg | |
| 2012/0151397 A1* | 6/2012 | Oberstein et al. | 715/769 |
| 2012/0159395 A1 | 6/2012 | Deutsch et al. | |
| 2012/0159402 A1 | 6/2012 | Nurmi et al. | |
| 2012/0167008 A1 | 6/2012 | Zaman et al. | |
| 2012/0167011 A1 | 6/2012 | Zaman et al. | |
| 2012/0169593 A1 | 7/2012 | Mak et al. | |
| 2012/0174005 A1 | 7/2012 | Deutsch | |
| 2012/0174029 A1* | 7/2012 | Bastide et al. | 715/800 |
| 2012/0176401 A1 | 7/2012 | Hayward et al. | |
| 2012/0179992 A1 | 7/2012 | Smuga et al. | |
| 2012/0210265 A1 | 8/2012 | Delia et al. | |
| 2012/0212495 A1 | 8/2012 | Butcher | |
| 2012/0216139 A1 | 8/2012 | Ording et al. | |
| 2012/0233571 A1 | 9/2012 | Wever et al. | |
| 2012/0244841 A1 | 9/2012 | Teng | |
| 2012/0254780 A1 | 10/2012 | Mouton | |
| 2012/0265644 A1 | 10/2012 | Roa et al. | |
| 2012/0290962 A1 | 11/2012 | Zielinski et al. | |
| 2012/0299968 A1 | 11/2012 | Wong et al. | |
| 2012/0304068 A1 | 11/2012 | Zaman et al. | |
| 2012/0304092 A1 | 11/2012 | Jarrett et al. | |
| 2012/0304108 A1 | 11/2012 | Jarrett et al. | |
| 2012/0304113 A1 | 11/2012 | Patten et al. | |
| 2012/0304114 A1 | 11/2012 | Wong et al. | |
| 2012/0304116 A1 | 11/2012 | Donahue et al. | |
| 2012/0304117 A1 | 11/2012 | Donahue et al. | |
| 2012/0304118 A1 | 11/2012 | Donahue et al. | |
| 2012/0311485 A1* | 12/2012 | Caliendo et al. | 715/784 |
| 2012/0323992 A1 | 12/2012 | Brobst et al. | |
| 2013/0031508 A1 | 1/2013 | Kodosky et al. | |
| 2013/0033525 A1 | 2/2013 | Markiewicz | |
| 2013/0042203 A1 | 2/2013 | Wong et al. | |
| 2013/0042206 A1 | 2/2013 | Zaman et al. | |
| 2013/0044141 A1 | 2/2013 | Markiewicz | |
| 2013/0047079 A1 | 2/2013 | Kroeger et al. | |
| 2013/0047105 A1 | 2/2013 | Jarrett | |
| 2013/0047117 A1 | 2/2013 | Deutsch | |
| 2013/0057587 A1 | 3/2013 | Leonard et al. | |
| 2013/0063442 A1 | 3/2013 | Zaman | |
| 2013/0063443 A1 | 3/2013 | Garside | |
| 2013/0063465 A1 | 3/2013 | Zaman | |
| 2013/0063490 A1 | 3/2013 | Zaman | |
| 2013/0067381 A1 | 3/2013 | Yalovsky | |
| 2013/0067390 A1 | 3/2013 | Kwiatkowski | |
| 2013/0067391 A1 | 3/2013 | Pittappilly | |
| 2013/0067398 A1 | 3/2013 | Pittappilly | |
| 2013/0067399 A1 | 3/2013 | Elliott | |
| 2013/0067412 A1 | 3/2013 | Leonard | |
| 2013/0067420 A1 | 3/2013 | Pittappilly | |
| 2013/0093757 A1 | 4/2013 | Cornell | |
| 2014/0082552 A1 | 3/2014 | Zaman | |
| 2014/0109008 A1 | 4/2014 | Zaman | |

FOREIGN PATENT DOCUMENTS

| | | |
|---|---|---|
| CN | 101114303 | 1/2008 |
| CN | 101809531 | 8/2010 |
| CN | 102004603 | 4/2011 |
| CN | 102033710 | 4/2011 |
| CN | 102197702 | 9/2011 |
| CN | 102460370 | 5/2012 |
| EP | 0583060 | 2/1994 |
| EP | 1752868 | 2/2007 |
| JP | 2004227393 | 8/2004 |
| JP | 2004357257 | 12/2004 |
| KR | 200303655 | 2/2003 |
| KR | 20060019198 | 3/2006 |
| KR | 1020070036114 | 4/2007 |
| KR | 1020070098337 | 10/2007 |
| KR | 20070120368 | 12/2007 |
| KR | 1020080025951 | 3/2008 |
| KR | 1020080041809 | 5/2008 |
| KR | 1020080076390 | 8/2008 |
| KR | 100854333 | 9/2008 |
| KR | 1020080084156 | 9/2008 |
| KR | 1020080113913 | 12/2008 |
| KR | 1020090041635 | 4/2009 |
| KR | 20100010072 | 2/2010 |
| KR | 20100048375 | 5/2010 |
| KR | 20100056369 | 5/2010 |
| KR | 102010005636 | 5/2010 |
| TW | 201023026 | 6/2010 |
| WO | WO-9926127 | 5/1999 |
| WO | WO-0129976 | 4/2001 |
| WO | WO-2005026931 | 3/2005 |
| WO | WO-2005027506 | 3/2005 |
| WO | WO-2006019639 | 2/2006 |
| WO | WO-2007121557 | 11/2007 |
| WO | WO-2007134623 | 11/2007 |
| WO | WO-2008030608 | 3/2008 |

(56) References Cited

FOREIGN PATENT DOCUMENTS

| WO | WO-2008031871 | 3/2008 |
|---|---|---|
| WO | WO-2008035831 | 3/2008 |
| WO | WO-2009000043 | 12/2008 |
| WO | WO-2009012398 | 1/2009 |
| WO | WO-2009049331 | 4/2009 |
| WO | WO-2010024969 | 3/2010 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010125451 | 11/2010 |
| WO | WO-2010135155 | 11/2010 |
| WO | WO-2011041885 | 4/2011 |

OTHER PUBLICATIONS

Greg Perry, "Teach Yourself Windows 95 in 24 Hours", 1997, Sams Publishing, 2nd Edition, P. 193-198.*
"Adobe Acrobat 8 Standard User Guide", Adobe Systems Incorporated,(2007),pp. 34 & 36.
"Advisory Action", U.S. Appl. No. 12/414,382, (Jan. 20, 2012),3 pages.
"Advisory Action", U.S. Appl. No. 12/433,605, (Apr. 5, 2012),3 pages.
"Alltel Adds Dedicated Search Key to Phones", Retrieved from: <http://www.phonescoop.com/news/item.php?n=2159> on Nov. 26, 2008., (Apr. 12, 2007),2 Pages.
"Android 2.3 Users Guide", AUG-2.3-103, Android mobile technology platform 2.3,(Dec. 13, 2010),380 pages.
"Apple iPhone—8GB AT&T", Retrieved from: <http://nytimes.com.com/smartphones/apple-iphone-8gb-at/4515-6452_7-32309245.html> on Nov. 20, 2008, (Jun. 29, 2007),11 pages.
"Application User Model IDs ", Retrieved from: <http://msdn.microsoft.com/en-us/library/dd378459(VS.85).aspx> on Sep. 28, 2010, (2010), 6 pages.
"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., (Nov. 11, 2008),3 pages.
"Basics of Your Device: Get Familiar with the Home Screen", *Nokia USA—How to*, retrieved from <http://www.nokia.ca/get-support-and-software/product-support/c6-01/how-to#> on May 11, 2011,3 pages.
"Blackberry office tools: Qwerty Convert", Retrieved from: <http://blackberrysoftwarelist.net/blackberry/download-software/blackberry-office/qwerty_convert.aspx> on Nov. 20, 2008, (Nov. 20, 2008),1 page.
"Calc4M", Retrieved from: <http://www.hellebo.com/Calc4M.html> on Dec. 11, 2008, (Sep. 10, 2008),4 Pages.
"Class ScrollView", Retrieved from: <http://www.blackberry.com/developers/docs/6.0.0api/net/rim/device/api/ui/ScrollView.html> on Sep. 28, 2010, 13 pages.
"Content-Centric E-Mail Message Analysis in Litigation Document Reviews", Retrieved from: <http://www.busmanagement.com/article/Issue-14/Data-Management/Content-Centric-E-Mail-Message-Analysis-in-Litigation-Document-Reviews/> on May 6, 2009, (2009),5 Pages.
"Dial a number", Retrieved from: <http://www.phonespell.org/ialhelp.html> on Nov. 20, 2008,1 page.
"DuoSense™ Multi-Touch Gestures", Retrieved from: <http://www.n-trig.com/Data/Uploads/Misc/DuoSenseMTG_final.pdf>, (Jul. 2008),4 pages.
"Elecont Quick Desktop 1.0.43", Retrieved from: <http://handheld.softpedia.com/get/System-Utilities/Launcher-Applications/Elecont-Quick-Desktop-72131.shtml> on May 5, 2009., (Mar. 13, 2009),2 pages.
"Email Notification for Microsoft Outlook and Outlook Express", Retrieved from: <http://www.contextmagic.com/express-notification/> on Sep. 29, 2010, (Jul. 21, 2004),3 pages.
"Enhanced IBM Power Systems Software and PowerVM Restructuring", *IBM United States Announcement 208-082*, dated Apr. 8, 2008, available at <http://www.ibm.com/common/ssi/rep_ca/2/897/ENUS208-082/ENUS208082.PDF>, (Apr. 8, 2008),pp. 1-19.
"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, (Aug. 1, 2008),14 pages.
"Extended European Search Report", European Patent Application No. 09818253.8, (Apr. 10, 2012),7 pages.
"eXtreme Energy Conservation: Advanced Power-Saving Software for Wireless Devices", *White Paper, Freescale Semiconductor, Inc.*, Document No. XTMENRGYCNSVWP, Rev #0, available at <http://www.freescale.com/files/32bit/doc/white_paper/XTMENRGYCNSVWP.pdf>,(Feb. 2006),15 pages.
"Final Office Action", U.S. Appl. No. 11/305,789, (Apr. 1, 2009),10 pages.
"Final Office Action", U.S. Appl. No. 11/502,264, (Feb. 4, 2010),15 pages.
"Final Office Action", U.S. Appl. No. 11/502,264, (Apr. 3, 2009),9 pages.
"Final Office Action", U.S. Appl. No. 12/244,545, (Dec. 7, 2011),16 pages.
"Final Office Action", U.S. Appl. No. 12/244,545, (Sep. 7, 2012),23 pages.
"Final Office Action", U.S. Appl. No. 12/413,977, (Nov. 17, 2011),16 pages.
"Final Office Action", U.S. Appl. No. 12/414,382, (Dec. 23, 2011),7 pages.
"Final Office Action", U.S. Appl. No. 12/414,476, (Dec. 1, 2011),20 pages.
"Final Office Action", U.S. Appl. No. 12/433,605, (Feb. 3, 2012),11 pages.
"Final Office Action", U.S. Appl. No. 12/433,667, (Sep. 13, 2011),17 pages.
"Final Office Action", U.S. Appl. No. 12/469,458, (Nov. 17, 2011),15 pages.
"Final Office Action", U.S. Appl. No. 12/469,480, (Feb. 9, 2012),17 pages.
"Final Office Action", U.S. Appl. No. 12/484,799, (Apr. 30, 2012),13 pages.
"Final Office Action", U.S. Appl. No. 12/560,081, (Mar. 14, 2012),16 pages.
"Freeware.mobi", Retrieved from: <http://www.palmfreeware.mobi/download-palette.html> Nov. 6, 2008, (Oct. 9, 2001),2 pages.
"GnomeCanvas", Retrieved from: <http://library.gnome.org/devel/libgnomecanyas/unstable/GnomeCanyas.html> on Sep. 28, 2010, 11 pages.
"How Do I Cancel a "Drag" Motion on an Android Seekbar?", retrieved from <http://stackoverflow.com/questions/2917969/how-do-i-cancel-a-drag-motion-on-an-android-seekbar> on Jun. 20, 2011,(May 28, 2010),1 page.
"How do I use my Categories with my Weblog?", Retrieved from: <http://tpsupport.mtcs.sixapart.com/tp/us-tp1/how_do_i_use_categories_with_my_weblog.html> on Sep. 28, 2010, (Sep. 16, 2009),3 pages.
"How do you dial 1-800-FLOWERS", Retrieved from: <http://blogs.msdn.com/windowsmobile/archive/2007/02/06/how-do-you-dial-1-800-flowers.aspx> on Nov. 20, 2008, (Feb. 6, 2007),24 pages.
"HTC Shows HTC Snap with Snappy Email Feature", Retrieved from: <http://www.wirelessandmobilenews.com/smartphones/ on May 5, 2009>, (May 4, 2009),10 Pages.
"IntelliScreen-New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, (May 13, 2008),11 pages.
"International Search Report and Written Opinion", International Application Number PCT/US2011/055521, (May 15, 2012),9 pages.
"International Search Report and Written Opinion", International Application No. PCT/US2011/055522, (May 15, 2012),9 pages.
"International Search Report and Written Opinion", International Application No. PCT/US2011/055514, (May 22, 2012),8 pages.

(56) References Cited

OTHER PUBLICATIONS

"International Search Report", Application No. PCT/US2010/028553, Application Filing Date: Mar. 24, 2010,(Nov. 9, 2010),9 pages.

"Internet Explorer Window Restrictions", Retrieved from: http://technet.microsoft.com/en-us/library/cc759517(WS.10).aspx on Jun. 28, 2011, Microsoft TechNet,5 pages.

"Introduction to Windows Touch", Retrieved from: <http://download.microsoft.com/download/a/d/f/adf1347d-08dc-41a4-9084-623b1194d4b2/Win7_touch.docx>, (Dec. 18, 2008),pp. 1-7.

"iPad User Guide", retrieved from <http://cyndidannerkuhn.info/CDK/iPads_Resources_files/iPad_User_Guide.pdf> on Jun. 17, 2011,154 pages.

"iPod touch User Guide for iPhone OS 3.0 Software", Apple Inc.,(2009),153 pages.

"Keyboard (5)", Retrieved from: <http://landru.uwaterloo.ca/cgi-bin/man.cgi?section=5&topic=keyboard> on Dec. 11, 2008., (Aug. 11, 1997),8 Pages.

"Keyboard Shortcuts", Retrieved from:.<http://www.pctoday.com/editorial/article.asp?article=articles%2F2005%2Ft0311%2F26t11%2F26t11.asp> on Aug. 3, 2009., (Nov. 2005),5 pages.

"Kiosk Browser Chrome Customization Firefox 2.x", Retrieved from: <http://stlouis-shopper.com/cgi-bin/mozdev-wiki/,pl?ChromeCustomization> on Oct. 22, 2008 *Making a new chrome for the kiosk browser*, Kiosk Project Kiosk Browser Chrome Customization Firefox-2.x,(Aug. 16, 2007),2 pages.

"Live Photo Gallery—Getting Started—from Camera to Panorama", Retrieved from: <http://webdotwiz.spaces.live.com/blog/cns!2782760752B93233!1729.entry> on May 5, 2009., (Sep. 2008),7 Pages.

"Magic mouse", Retrieved from: <http://www.apple.com/magicmouse/> on May 10, 2011,3 pages.

"MIDTB Tip Sheet: Book Courier", Retrieved from: <http://www.midtb.org/tipsbookcourier.htm> on Dec. 11, 2008., (Sep. 26, 2005),6 Pages.

"Mobile/UI/Designs/TouchScreen", Retrieved from: <https://wiki.mozilla.org/Mobile/UI/Designs/TouchScreen> on May 6, 2009., (Feb. 3, 2009),15 Pages.

"moGo beta v.0.4", Retrieved from: <http://forum.xda-developers.com/showthread.php?t=375196> on Sep. 27, 2010, (Mar. 7, 2008),10 pages.

"Multi-touch", Retrieved from <http://en.wikipedia.org/wiki/Multi-touch#Microsoft_Surface> on Apr. 24, 2009, (Apr. 17, 2009),8 pages.

"New Features in WhatsUp Gold v12.0", retrieved from <http://www.netbright.com.th/?name=product&file=readproduct&id=12> on Jun. 10, 2011,4 pages.

"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., (Jan. 27, 2006),2 Pages.

"Non-Final Office Action", U.S. Appl. No. 11/215,052, (Jun. 23, 2011),17 pages.

"Non-Final Office Action", U.S. Appl. No. 11/305,789, (Sep. 21, 2009),5 pages.

"Non-Final Office Action", U.S. Appl. No. 11/502,264, (Sep. 30, 2009),15 pages.

"Non-Final Office Action", U.S. Appl. No. 11/502,264, (Sep. 14, 2012),14 pages.

"Non-Final Office Action", U.S. Appl. No. 12/244,545, (Mar. 27, 2012),18 pages.

"Non-Final Office Action", U.S. Appl. No. 12/244,545, (Aug. 17, 2011),15 pages.

"Non-Final Office Action", U.S. Appl. No. 12/413,977, (Jul. 19, 2011),17 pages.

"Non-Final Office Action", U.S. Appl. No. 12/413,977, (Jul. 20, 2012),18 pages.

"Non-Final Office Action", U.S. Appl. No. 12/414,382, (Jul. 26, 2011),9 pages.

"Non-Final Office Action", U.S. Appl. No. 12/414,434, (Jan. 17, 2012),7 pages.

"Non-Final Office Action", U.S. Appl. No. 12/414,434, (May 31, 2012),7 pages.

"Non-Final Office Action", U.S. Appl. No. 12/414,434, (Aug. 2, 2011),6 pages.

"Non-Final Office Action", U.S. Appl. No. 12/414,455, (Aug. 29, 2011),8 pages.

"Non-Final Office Action", U.S. Appl. No. 12/414,458, (Jul. 6, 2011),8 pages.

"Non-Final Office Action", U.S. Appl. No. 12/414,476, (Nov. 9, 2012),22 pages.

"Non-Final Office Action", U.S. Appl. No. 12/414,476, (Aug. 3, 2011),21 pages.

"Non-Final Office Action", U.S. Appl. No. 12/433,605, (Jun. 24, 2011),10 pages.

"Non-Final Office Action", U.S. Appl. No. 12/433,667, (Jun. 7, 2011),15 pages.

"Non-Final Office Action", U.S. Appl. No. 12/433,667, (Feb. 3, 2012),16 pages.

"Non-Final Office Action", U.S. Appl. No. 12/469,419, (Nov. 9, 2011),15 pages.

"Non-Final Office Action", U.S. Appl. No. 12/469,419, (May 23, 2012),13 pages.

"Non-Final Office Action", U.S. Appl. No. 12/469,458, (Jul. 1, 2011),15 pages.

"Non-Final Office Action", U.S. Appl. No. 12/469,458, (Sep. 21, 2012),14 pages.

"Non-Final Office Action", U.S. Appl. No. 12/469,480, (Oct. 17, 2012),16 pages.

"Non-Final Office Action", U.S. Appl. No. 12/469,480, (Sep. 22, 2011),14 pages.

"Non-Final Office Action", U.S. Appl. No. 12/470,558, (Nov. 22, 2011),9 pages.

"Non-Final Office Action", U.S. Appl. No. 12/480,969, (Aug. 7, 2012),15 pages.

"Non-Final Office Action", U.S. Appl. No. 12/484,799, (Aug. 11, 2011),12 pages.

"Non-Final Office Action", U.S. Appl. No. 12/484,799, (Aug. 7, 2012),13 pages.

"Non-Final Office Action", U.S. Appl. No. 12/484,845, (Dec. 7, 2011),16 pages.

"Non-Final Office Action", U.S. Appl. No. 12/560,081, (Dec. 7, 2011),16 pages.

"Non-Final Office Action", U.S. Appl. No. 12/983,106, (Nov. 9, 2012),17 pages.

"Non-Final Office Action", U.S. Appl. No. 13/492,495, (Sep. 17, 2012),8 pages.

"Notice of Allowance", U.S. Appl. No. 11/215,052, (Mar. 14, 2012),5 pages.

"Notice of Allowance", U.S. Appl. No. 11/305,789, (Nov. 23, 2009),8 pages.

"Notice of Allowance", U.S. Appl. No. 12/414,382, (Apr. 4, 2012),4 pages.

"Notice of Allowance", U.S. Appl. No. 12/414,434, (Aug. 17, 2012),4 pages.

"Notice of Allowance", U.S. Appl. No. 12/414,455, (Jan. 4, 2012),4 pages.

"Notice of Allowance", U.S. Appl. No. 12/414,458, (Oct. 31, 2011),2 pages.

"Notice of Allowance", U.S. Appl. No. 12/414,458, (Nov. 29, 2011),2 pages.

"Notice of Allowance", U.S. Appl. No. 12/414,458, (Aug. 10, 2011),6 pages.

"Notice of Allowance", U.S. Appl. No. 12/470,558, (Apr. 2, 2012),7 pages.

"Notice of Allowance", U.S. Appl. No. 12/470,558, (Aug. 23, 2012),2 pages.

"Notice of Allowance", U.S. Appl. No. 12/484,799, (Oct. 22, 2012),10 pages.

"Notice of Allowance", U.S. Appl. No. 12/484,845, (Mar. 16, 2012),5 pages.

(56) References Cited

OTHER PUBLICATIONS

"Notifications", retrieved from <http://msdn.microsoft.com/en-us/library/aa511497.aspx> on May 10, 2011,16 pages.
"OmneMon™ System Resource Metrics", retrieved from <http://www.omnesys.com/documents/OmneMonSRM_Brochure.pdf> on Jun. 10, 2011,3 pages.
"ONYX Graphics Announces New ONYX Prepedge Job Preparation Software", retrieved from <http://www.largeformatreview.com/rip-software/433-onyx-graphics-announces-new-onyx-> on May 10, 2011,2 pages.
"Oracle8i Application Developer's Guide—Advanced Queuing Release 2 (8.1.6)", Retrieved from: http://www.cs.otago.ac.nz/oradocs/appdev.817/a76938/adq01in5.htm on May 6, 2009., (Dec. 1999),8 pages.
"Oracle8i Application Developer's Guide—Advanced Queuing", Retrieved from: http://www.cs.umbc.edu/help/oracle8/server.815/a68005/03_adq1i.htm on May 6, 2009., (Feb. 1999),29 Pages.
"Oracle8i Concepts Release 8.1.5", Retrieved from: http://www.cs.umbc.edu/help/oracle8/server.815/a67781/c16queue.htm on May 6, 2009., (Feb. 1999),10 Pages.
"Palette Extender 1.0.2", Retrieved from: <http://palette-extender.en.softonic.com/symbian> on Nov. 6, 2008, (Jan. 21, 2003),2 pages.
"Parallax Scrolling", Retrieved from: <http://en.wikipedia.org/wiki/Parallax_scrolling> on May 5, 2009., (May 4, 2009),3 Pages.
"PCT Search Report and Written Opinion", Application No. PCT/US2009/061382, (May 26, 2010),10 pages.
"PCT Search Report and Written Opinion", Application No. PCT/US2009/061735, (Jun. 7, 2010),11 pages.
"PCT Search Report and Written Opinion", Application No. PCT/US2010/028699, (Oct. 4, 2010),10 pages.
"PCT Search Report and Written Opinion", Application No. PCT/US2010/028555, (Oct. 12, 2010),10 pages.
"PCT Search Report and Written Opinion", Application No. PCT/US2010/034772, (Dec. 29, 2010),12 pages.
"PCT Search Report and Written Opinion", Application No. PCT/US2011/055511, (Apr. 24, 2012),9 pages.
"PCT Search Report and Written Opinion", Application No. PCT/US2011/055520, (May 9, 2012),8 pages.
"PCT Search Report and Written Opinion", Application No. PCT/US2011/055523, (May 10, 2012),9 pages.
"PCT Search Report and Written Opinion", Application No. PCT/US2011/055513, (Mar. 27, 2012),8 pages.
"PCT Search Report and Written Opinion", Application No. PCT/US2011/055512, (May 24, 2012),8 pages.
"PCT Search Report and Written Opinion", Application No. PCT/US2011/055524, (Jun. 1, 2012),8 pages.
"PCT Search Report and Written Opinion", Application No. PCT/US2011/065702, (Aug. 29, 2012),8 pages.
"PCT Search Report and Written Opinion", Application No. PCT/US2011/055712, (Sep. 21, 2012),9 pages.
"PCT Search Report and Written Opinion", Application No. PCT/US2011/055736, (Sep. 17, 2012),8 pages.
"PCT Search Report and Written Opinion", Application No. PCT/US2011/055496, (Sep. 12, 2012),9 pages.
"PCT Search Report and Written Opinion", Application No. PCT/US2011/067073, (Sep. 17, 2012),8 pages.
"PCT Search Report and Written Opinion", Application No. PCT/US2011/055746, (Sep. 27, 2012),9 pages.
"PCT Search Report and Written Opinion", Application No. PCT/US2011/055725, (Sep. 27, 2012),10 pages.
"PCT Search Report and Written Opinion", Application No. PCT/US2011/055478, (Sep. 27, 2012),9 pages.
"PCT Search Report and Written Opinion", Application No. PCT/US2011/055493, (Sep. 26, 2012),9 pages.
"PCT Search Report and Written Opinion", PCT Application No. PCT/US2010/038730, (Jan. 19, 2011),8 pages.
"PCT Search Report", Application Serial No. PCT/US2009/061864, (May 14, 2010),10 pages.

"Push Notifications Overview for Windows Phone", Retrieved from: <http://msdn.microsoft.com/en-us/library/ff402558%28VS.92%29.aspx> on Sep. 30, 2010, (Sep. 3, 2010),1 page.
"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., (Jul. 15, 2005),5 Pages.
"SecureMe-Anti-Theft Security Application for S60 3rd", Retrieved from: <http:/www.killermobile.com/newsite/mobile-software/s60-applications/secureme-%11-anti%11theft-security-application-for-s60-3rd.htm> on Jun. 28, 2011, (Dec. 15, 2008),3 pages.
"Snap", *Windows 7 Features*, retrieved from <http://windows.microsoft.com/en-US/windows7/products/features/snap> on Sep. 23, 2011,2 pages.
"Symbian Applications", Retrieved from: <http://symbianfullversion.blogspot.com/2008_12_01_archive.html> on May 5, 2009., (Jan. 2009),51 Pages.
"The Map Screen", retrieved from <http://www.symbianos.org/whereamiusersguide> on Jun. 17, 2011,3 pages.
"Top 3 Task Switchers for Andriod", *TechCredo*, retrieved from <http:/www.techcredo.com/android/top-3-task-switchers-for-android> May 11, 2011,(Mar. 9, 2011),5 pages.
"Top Android App: Swipepad", *Best Android Apps Review*, retrieved from <http://www.bestandroidappsreview.com/2011/01/top-android-app-swipepad-launcher.html> on May 11, 2011,4 pages.
"Touch Shell Free", Retrieved from: <http://www.pocketpcfreeware.mobi/download-touch-shell-free.html> on May 5, 2009., (Feb. 23, 2009),2 Pages.
"User Guide", retrieved from <http://wireframesketcher.com/help/help.html> on Jun. 17, 2011,19 pages.
"Windows 8 Is Gorgeous, But Is It More Than Just a Shell? (Video)", retrieved from <http://techcrunch.com/2011/06/02/windows-8-gorgeous-shell-video/> on Jun. 20, 2011,(Jun. 2, 2011),6 pages.
"Windows Phone 7 (Push Notification)", retrieved from <http://unknownerror.net/2011-06/windows-phone-7-push-notification-36520> on Jul. 6, 2011,4 pages.
"Windows Phone 7 Live Tiles", Retrieved from: <http://www.knowyourmobile.com/microsoft/windowsphone7/startscreen/640737/windows_phone_7_live_tiles.html> on May 11, 2011,(Oct. 20, 2010),3 pages.
"Winterface Review", Retrieved from: <http://www.mytodayscreen.com/winterface-review/> on Nov. 12, 2008, (Jul. 9, 2008),42 pages.
"Wornma", Retrieved from: <http://www.womma.org/blog/links/wom-trends/> on May 5, 2009., (2007),70 Pages.
"Working with Multiple Windows", *MSOFFICE tutorial!*, retrieved from <http://www.msoffice-tutorial.com/working-with-multiple-windows.php> on Sep. 23, 2011,3 pages.
"Yui 3: ScrollView [beta]", Retrieved from: <http://developer.yahoo.com/yui/3/scrollview/> on Sep. 28, 2010, 5 pages.
Bates, John "A Framework to Support Large-Scale", *University of Cambridge Computer Laboratory*, Available at <http://citeseerx.ist.psu.edu/viewdoc/download?doi=10.1.1.48.1690&rep=rep1&type=pdf>,(1996),8 pages.
Beiber, Gerald et al., "Screen Coverage: A Pen-Interaction Problem for PDA's and Touch Screen Computers", In Proceedings of ICWMC 2007,(Mar. 2007),6 pages.
Bjork, Staffan et al., "Redefining the Focus and Context of Focus+Context Visualizations", *In Proceedings of INFOVIS 2000*, Available at <http://www.johan.redstrom.se/papers/redefining.pdf>,(Oct. 2000),9 pages.
Bowes, James et al., "Transparency for Item Highlighting", *Faculty of Computing Science, Dalhousie University*, Available at <http://torch.cs.dal.ca/~dearman/pubs/GI2003-bowes,dearman,perkins-paper.pdf>,(2003),2 pages.
Buring, Thorsten "User Interaction with Scatterplots on Small Screens—A Comparative Evaluation of Geometric-Semantic Zoom and Fisheye Distortion", *IEEE Transactions on Visualization and Computer Graphics*, vol. 12, Issue 5, Available at <http://citeseerx.ist.psu.edu/viewdoc/download?doi=10.1.1.134.4568&rep=rep1&type=pdf.>,(Sep. 2006),pp. 829-836.
Carrera, Enrique V., et al., "Conserving Disk Energy in Network Servers", available at <http://citeseerx.ist.psu.edu/viewdoc/download?doi=10.1.1.6.8301&rep=rep1&type=ps>,(Nov. 2002),15 pages.

(56) References Cited

OTHER PUBLICATIONS

Cawley, Christian "How to Customise Your Windows Phone 7", Retrieved from: <http://www.brighthub.com/mobile/windows-mobile-platform/articles/95213.aspx> on May 10, 2011,(Nov. 12, 2010),3 pages.

Cawley, Christian "Windows Phone 7 Customization Tips and Tricks", retrieved from <http://www.brighthub.com/mobile/windows-mobile-platform/articles/95213.aspx> on Jun. 20, 2011,(May 16, 2011),2 pages.

Cohen, Michael F., et al., "Wang Tiles for Image and Texture Generation", *In Proceedings of SIGGRAPH 2003*, Available <http://research.microsoft.com/en-us/um/people/cohen/WangFinal.pdf>,(2003),8 pages.

Damien, "7 Ways to Supercharge Multitasking in Android", retrieved from <http://maketecheasier.com/7-ways-to-supercharge-multitasking-in-android/2011/01/22/> on May 11, 2011,(Jan. 22, 2011),5 pages.

Davis, Ashley "A WPF Custom Control for Zooming and Panning", Retrieved from: <http://www.codeproject.com/KB/WPF/zoomandpancontrol.aspx> on Sep. 28, 2010, (Jun. 29, 2010),21 pages.

Delimarsky, Den "Sending Tile Push Notifications on Windows Phone 7", retrieved from <http://mobile.dzone.com/articles/sending-tile-push> on May 10, 2011,(Aug. 25, 2010),2 pages.

Denoue, Laurent et al., "WebNC: Efficient Sharing of Web Applications", *In Proceedings of WWW 2009*, Available at <http://www.fxpal.com/publications/FXPAL-PR-09-495.pdf>,(2009),2 pages.

Dolcourt, Jessica "Webware", Retrieved from: <http://news.cnet.com/webware/?categoryId=2010> on May 5, 2009., 13 Pages.

Dunsmuir, Dustin "Selective Semantic Zoom of a Document Collection", Available at <http://www.cs.ubc.ca/~tmm/courses/533/projects/dustin/proposal.pdf>,(Oct. 30, 2009),pp. 1-9.

Fisher, Bill "Cool Discussion of Push Notifications—Toast and Tile—on Windows Phone", Retrieved from: <http://www.windowsphoneexpert.com/Connection/forums/p/4153/18399.aspx> on Sep. 29, 2010, (May 3, 2010),3 pages.

Gade, Lisa "Samsung Alias u740", Retrieved from: <http://www.mobiletechreview.com/phones/Samsung-U740.htm> on Nov. 20, 2008, (Mar. 14, 2007),6 pages.

Gao, Rui "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, (Feb. 2007),pp. 1-42.

Ha, Rick et al., "Simkeys: An Efficient Keypad Configuration for Mobile Communications", Retrieved from: <http://ieeexplore.ieee.org/stamp/stamp.jsp?arnumber=01362557.> on Dec. 17, 2008, (Nov. 2004)7 Pages.

Harrison, Richard "Symbian OS C++ for Mobile Phones vol. 3", Retrieved from: <http://www.amazon.co.uk/Symbian-OS-Mobile-Phones-Press/dp/productdescription/0470066415> on Oct. 23, 2008, Symbian Press,(Jun. 16, 2003),4 pages.

Hickey, Andrew R., "Google Android has Landed; T-Mobile, HTC Unveil G1", Retrieved from: <http://www.crn.com/retail/210603348> on Nov. 26, 2008., (Sep. 23, 2008),4 pages.

Janecek, Paul et al., "An Evaluation of Semantic Fisheye Views for Opportunistic Search in an Annotated Image Collection", Available at <http://citeseerx.ist.psu.edu/viewdoc/download?doi=10.1.1.67.3084&rep=rep1&type=pdf> ,(Feb. 15, 2005),pp. 1-15.

Kcholi, Avi "Windows CE .NET Interprocess Communication", Retrieved from http://msdn.microsoft.com/en-us/library/ms836784.aspx on Jul. 17, 2008., (Jan. 2004),15 Pages.

La, Nick "Parallax Gallery", Available at <http://webdesignerwall.comtutorials/parallax-gallery/comment-page-1>,(Apr. 25, 2008),16 pages.

Long, Todd "Gmail Manager 0.6", Retrieved from: <https://addons.mozilla.org/en-US/firefox/addon/1320/> on Sep. 29, 2010, (Jan. 27, 2010),4 pages.

Mann, Richard et al., "Spectrum Analysis of Motion Parallax in a 3D Cluttered Scene and Application to Egomotion", *Journal of the Optical Society of America A*, vol. 22, No. 9, Available at <http://www.cs.uwaterloo.ca/~mannr/snow/josa-mann-langer.pdf>,(Sep. 2005),pp. 1717-1731.

Mantia, Louie "Multitasking: What Does It Mean?", retrieved from <http://mantia.me/blog/multitasking/> on Sep. 23, 2011,3 pages.

Mao, Jeng "Comments of Verizon Wireless Messaging Services, LLC", Retrieved from: http://www.ntia.doc.gov/osmhome/warnings/comments/verizon.htm on May 6, 2009., (Aug. 18, 2000),5 Pages.

Marie, Angelina "MacBook Trackpad Four Fingers Swipe Left/Right to Switch Applications", *MacBook Junkie*, retrieved from <http://www.macbookjunkie.com/macbook-trackbook-four-fingers-swipe-left-right-to-switch-applications/> on May 11, 2011,(Nov. 13, 2010),4 pages.

Mei, Tao et al., "Probabilistic Multimodality Fusion for Event Based Home Photo Clustering", Retrieved from: <http://ieeexplore.ieee.org//stamp/stamp.jsp?tp=&arnumber=04036960.>, (Dec. 26, 2006),pp. 1757-1760.

Nordgren, Peder "Development of a Touch Screen Interface for Scania Interactor", *Master's Thesis in Computing Science, UMEA University*, Available at <http://www.cs.umu.se/education/examina/Rapporter/PederNordgren.pdf>,(Apr. 10, 2007),pp. 1-59.

Oliver, Sam "Potential iPhone Usability and Interface Improvements", Retrieved from: <http://www.appleinsider.com/articles/08/09/18/potential_iphone_usability_and_interface_improvements.html> on Nov. 12, 2008, AppleInsider,(Sep. 18, 2008),4 pages.

Oryl, Michael "Review: Asus P527 Smartphone for North America", Retrieved from: <http://www.mobileburn.com/review.jsp?Id=4257> on Dec. 17, 2008., (Mar. 5, 2008),1 Page.

Padilla, Alfredo "Palm Treo 750 Cell Phone Review—Hardware", Retrieved from: <http://www.wirelessinfo.com/content/palm-Treo-750-Cell-Phone-Review/Hardware.htm> on Dec. 11, 2008., (Mar. 17, 2007),4 Pages.

Paul, Ryan "Hands-on: KDE 4.5 Launches with Tiling, New Notifications", Retrieved from: <http://arstechnica.com/open-source/reviews/2010/08/hands-on-kde-45-launches-with-tiling-new-notifications.ars> on Sep. 29, 2010, (Aug. 2010),3 pages.

Raghaven, Gopal et al., "Model Based Estimation and Verification of Mobile Device Performance", Available at http://alumni.cs.ucsb.edu/~raimisl/emsoft04_12.pdf.,(Sep. 27-29, 2004),10 Pages.

Ray, Bill "Microsoft Re-Tiles Mobile Platform for Windows 7 Era", retrieved from <http://www.theregister.co.uk/2010/02/15/windows_phone_7_series/> on May 11, 2011,(Feb. 15, 2010),2 pages.

Reed, Brad "Microsoft Demos Windows Mobile 6.1 at CTIA", Retrieved from: <http://www.networkworld.com/news/2008/040208-ctia-microsoft-windows-mobile.html> on Jul. 18, 2008 (Apr. 2, 2008),1 page.

Remond, Mickael "Mobile Marketing Solutions", Retrieved from: <http://www.mobilemarketingmadazine.co.uk/mobile_social_networking/> on May 5, 2009., (Apr. 28, 2009),16 Pages.

Rice, Stephen V., et al., "A System for Searching Sound Palettes", *Proceedings of the Eleventh Biennial Symposium on Arts and Technology.*, Available at <http://www.comparisonics.com/FindSoundsPalettePaper.pdf>,(Feb. 2008),6 pages.

Ritchie, Rene "iOS 4 features: iPod touch Wi-Fi stays connected when asleep—iPhone too?", Retrieved from: <http://www.goip.com/2010/06/ios-4-features-ipod-touch-wi-fi-stays-connected-when-asleep-%E2%80%94-iphone-too/> on Sep. 30, 2010, (Jun. 14, 2010),2 pages.

Ritscher, Walt "Using Surface APIs in your WPF application—Part 1", Retrieved from: <http://blog.wpfwonderland.com/2009/06/30/using-surface-apis-in-your-wpf-application/> on Sep. 28, 2010, (Jun. 30, 2009),7 pages.

Roberts, Neil "Touching and Gesturing on the iPhone", Available at <http://www.sitepen.com/blog/2008/07/10/touching-and-gesturing-on-the-iphone/comments-pare-1>,(Jul. 10, 2008),16 pages.

Sandoval, Guillermo L., "A development platform and execution environment for mobile applications", *Universidad Autónoma de Baja California, School of Chemical Sciences and Engineering*, Available at <http://citeseerx.ist.psu.edu/viewdoc/download?doi=10.1.1.86.7989&rep=rep1&type=pdf>,(2004),18 pages.

(56) References Cited

OTHER PUBLICATIONS

Singh, Kundan et al., "CINEMA: Columbia InterNet Extensible Multimedia Architecture", Available at <http://www1.cs.columbia.edu/~library/TR-repository/reports/reports-2002/cucs-011-02.pdf>,(Sep. 3, 2002),83 Pages.
Smith, Greg et al., "GroupBar: The TaskBar Evolved", *Proceedings of OZCHI 2003*, Available at <http://research.microsoft.com/pubs/64316/ozchi2003-groupbar.pdf>,(Nov. 2003),pp. 1-10.
Steinicke, Frank et al., "Multi-Touching 3D Data: Towards Direct Interaction in Stereoscopic Display Environments coupled with Mobile Devices", *Advanced Visual Interfaces (AVI) Workshop on Designing Multi-Touch Interaction Techniques for Coupled Public*, Available at <http://viscg.uni-muenster.de/publications/2008/SHSK08/ppd-workshop.-pdf.>,(Jun. 15, 2008),4 Pages.
Suror, "PocketShield-New Screenlock App for the HTC Diamond and Pro", Retrieved from: <http://wmpoweruser.com/?tag=htc-touch-diamond> on Jun. 28, 2011, (Oct. 23, 2008),2 pages.
Terpstra, Brett "Beta Beat: Grape, a New Way to Manage Your Desktop Clutter", Retrieved from: *Beta Beat: Grape, a New Way to Manage Your Desktop Clutter* on Jun. 28, 2011 (Apr. 14, 2009),4 pages.
Vallerio, Keith S., et al., "Energy-Efficient Graphical User Interface Design", Retrieved from: <http://www.cc.gatech.edu/classes/AY2007/cs7470_fall/zhonq-energy-efficient-user-interface.pdf>, (Jun. 10, 2004),pp. 1-13.
Vermeulen, Jan "BlackBerry PlayBook Hands-on", retrieved from <http://mybroadband.co.za/news/gadgets/20104-BlackBerry-PlayBook-hands-.html> on May 11, 2011,(May 8, 2011),4 pages.
Viticci, Federico "Growl 1.3 to Be Released on Mac App Store, Introduce Lion Support and Drop GrowlMail Support", Retrieved from: <http://www.macstories.net/stories/growl-1-3-to-be-released-on-mac-app-store-introduce-lion-support-and-drop-growlmail-support/> on Jul. 22, 11,(Jul. 6, 2011),6 pages.
Vornberger, Jan "Bluetile", Retrieved from: <http://www.bluetile.org> on Sep. 29, 2010, 5 pages.
Wilson, Andrew D., "Robust Computer Vision-Based Detection of Pinching for One and Two-Handed Gesture Input", *In Proceedings of UIST 2006*, Available at <http://research.microsoft.com/en-us/um/people/awilson/publications/wilsonuist2006/uist%202006%20taffi.pdf>,(Oct. 2006),4 pages.
Wilson, Tracy V., "How the iPhone Works", Retrieved from: <http://electronics.howstuffworks.com/iphone2.htm> on Apr. 24, 2009, (Jan. 2007),9 pages.
Wobbrock, Jacob O., et al., "User-Defined Gestures for Surface Computing", *CHI 2009*, Apr. 4-9, 2009, Boston, MA, available at <http://faculty.washington.edu/wobbrock/pubs/chi-09.2.pdf>,(Apr. 4, 2009),10 pages.
Wu, Chung et al., "Achieving a Superior Ownership Experience in Manageability and Quality for Siebel CRM", available at <http://www.oracle.com/us/products/enterprise-manager/superior-exp-for-siebel-crm-068962.pdf>,(Aug. 2008),25 pages.
Wyatt, Paul "/Flash/the art of parallax scrolling", .net Magazine,(Aug. 1, 2007),pp. 74-76.
Yang, Seungji et al., "Semantic Photo Album Based on MPEG-4 Compatible Application Format", Retrieved from: <http://ieeexplore.ieee.org/stamp/stamp.jsp?arnumber=04146254.>, (2007),2 Pages.
"Final Office Action", U.S. Appl. No. 11/502,264, (Mar. 29, 2013),16 pages.
"My Favorite Gadgets, System Monitor II", Retrieved from <http://www.myfavoritegadgets.info/monitors/SystemMonitorII/system-monitorII.html> on Mar. 12, 2013, (Jun. 8, 2010), 5 pages.
"Non-Final Office Action", U.S. Appl. No. 12/972,967, (Jan. 30, 2013),19 pages.
"Non-Final Office Action", U.S. Appl. No. 12/977,584, (Dec. 7, 2012), 8 pages.
"Non-Final Office Action", U.S. Appl. No. 12/978,184, (Jan. 23, 2013), 7 pages.
"Non-Final Office Action", U.S. Appl. No. 13/118,204, (Feb. 28, 2013), 13 pages.
"Non-Final Office Action", U.S. Appl. No. 13/118,257, (Mar. 5, 2013), 19 pages.
"Non-Final Office Action", U.S. Appl. No. 13/118,339, (Feb. 11, 2013), 15 pages.
"Non-Final Office Action", U.S. Appl. No. 13/118,347, (Feb. 12, 2013), 14 pages.
"Non-Final Office Action", U.S. Appl. No. 13/196,272, (Feb. 6, 2013), 10 pages.
"Non-Final Office Action", U.S. Appl. No. 13/224,258, (Jan. 8, 2013), 35 pages.
"Non-Final Office Action", U.S. Appl. No. 13/229,693, (Mar. 12, 2013), 21 pages.
"Non-Final Office Action", U.S. Appl. No. 13/492,495, (Dec. 19, 2012), 6 pages.
"Non-Final Office Action", U.S. Appl. No. 13/655,386, (Dec. 26, 2012), 23 pages.
"Non-Final Office Action", U.S. Appl. No. 13/656,354, (Feb. 6, 2013), 10 pages.
"Non-Final Office Action", U.S. Appl. No. 13/656,574, (Jan. 31, 2013), 21 pages.
"Non-Final Office Action", U.S. Appl. No. 13/657,621, (Feb. 7, 2013), 19 pages.
"Non-Final Office Action", U.S. Appl. No. 13/657,646, (Jan. 3, 2013), 13 pages.
"PCT Search Report and Written Opinion", Application No. PCT/US2011/067075, (Dec. 12, 2012), 10 pages.
Bruzzese, J. P., "Using Windows 7, Managing and Monitoring Windows 7—Chapter 11", *Que Publishing*, (May 5, 2010), 33 pages.
Gralla, Preston "Windows XP Hacks, Chapter 13—Hardware Hacks", *O'Reilly Publishing*, (Feb. 23, 2005), 25 pages.
Horowitz, Michael "Installing and Tweaking Process Explorer part 2", Retrieved <http://web.archive.org/web/20110510093838/http://blogs.computerworld.com/16165/installing_and_tweaking_process_explorer_part_2> on Mar. 12, 2013, (May 23, 2010), 7 pages.
Livingston, et al., "Windows 95 Secrets", 1995, *I DG Books Worldwide*, 3rd Edition, (1995), pp. 121-127.
Perry, Greg "Teach Yourself Windows 95 in 24 Hours", 1997, *Sams Publishing*, 2nd Edition, (1997), pp. 193-198.
"Final Office Action", U.S. Appl. No. 13/118,347, (Aug. 15, 2013), 25 pages.
"Non-Final Office Action", U.S. Appl. No. 13/073,300, (Jul. 25, 2013), 13 pages.
"Notice of Allowance", U.S. Appl. No. 12/978,184, (Aug. 2, 2013), 5 pages.
"PCT Search Report and Written Opinion", Application No. PCT/US2012/047091, (Dec. 27, 2012), 15 pages.
"Supplemental Notice of Allowance", U.S. Appl. No. 13/655,390, (Jul. 25, 2013), 2 pages.
"Final Office Action", U.S. Appl. No. 12/972,967, (Oct. 11, 2013), 21 pages.
"Final Office Action", U.S. Appl. No. 12/983,106, (Oct. 7, 2013),19 pages.
"Final Office Action", U.S. Appl. No. 13/118,204, (Nov. 21, 2013), 24 pages.
"Final Office Action", U.S. Appl. No. 13/224,258, (Sep. 11, 2013), 37 pages.
"Final Office Action", U.S. Appl. No. 13/657,621, (Sep. 10, 2013),18 pages.
"Non-Final Office Action", U.S. Appl. No. 13/228,707, (Oct. 25, 2013),12 pages.
"Non-Final Office Action", U.S. Appl. No. 13/228,876, (Nov. 22, 2013),14 pages.
"Non-Final Office Action", U.S. Appl. No. 13/229,155, (Nov. 18, 2013),14 pages.
"Non-Final Office Action", U.S. Appl. No. 13/655,390, (Dec. 17, 2012),12 pages.
"Notice of Allowance", U.S. Appl. No. 12/978,184, (Nov. 6, 2013), 5 pages.
"Notice of Allowance", U.S. Appl. No. 13/196,272, (Nov. 8, 2013), 8 pages.
"Supplemental Notice of Allowance", U.S. Appl. No. 12/977,584, (Sep. 16, 2013), 2 pages.

(56) References Cited

OTHER PUBLICATIONS

"Supplemental Notice of Allowance", U.S. Appl. No. 12/977,584, (Oct. 11, 2013), 2 pages.
"Supplemental Notice of Allowance", U.S. Appl. No. 13/655,390, (Sep. 19, 2013), 2 pages.
"Foreign Office Action", CN Application No. 201110429183.5, Jan. 6, 2014, 10 Pages.
"Foreign Office Action", CN Application No. 201110437542.1, Jan. 6, 2014, 10 Pages.
"Foreign Office Action", CN Application No. 201110437572.2, Dec. 3, 2013, 7 pages.
"Foreign Office Action", CN Application No. 201110454251.3, Dec. 27, 2013, 12 Pages.
"Restriction Requirement", U.S. Appl. No. 13/118,265, Feb. 27, 2014, 7 pages.
"Restriction Requirement", U.S. Appl. No. 13/118,288, Mar. 4, 2014, 7 pages.
"Supplemental Notice of Allowance", U.S. Appl. No. 12/978,184, Feb. 25, 2014, 2 pages.
"Final Office Action", U.S. Appl. No. 13/073,300, Apr. 1, 2014, 14 pages.
"Final Office Action", U.S. Appl. No. 13/118,333, Apr. 23, 2014, 22 pages.
"Final Office Action", U.S. Appl. No. 13/228,707, May 21, 2014, 16 pages.
"Final Office Action", U.S. Appl. No. 13/229,155, Jun. 12, 2014, 15 pages.
"Gestures Programming", Retrieved from <http://doc.qt.digia.com/4.6/gestures-overview.html> on May 28, 2014, 2010, 3 pages.
"Image Gestures Example", Retrieved from <http://doc.qt.digia.com/4.6/gestures-imagegestures.html> on May 28, 2014, 2010, 3 pages.
"Non-Final Office Action", U.S. Appl. No. 13/118,265, Jun. 10, 2014, 13 pages.
"Non-Final Office Action", U.S. Appl. No. 13/118,292, Jun. 6, 2014, 25 pages.
"Non-Final Office Action", U.S. Appl. No. 13/228,931, Apr. 7, 2014, 21 pages.
"Non-Final Office Action", U.S. Appl. No. 13/228,945, Apr. 14, 2014, 22 pages.
"Non-Final Office Action", U.S. Appl. No. 13/229,556, Mar. 28, 2014, 12 pages.
"Non-Final Office Action", U.S. Appl. No. 13/229,709, Apr. 7, 2014, 12 pages.
"Normalizing Text: A Java Tutorial by Oracle", Retrieved from: <http://docs.oracle.com/javase/tutorial/i18n/text/normalizerapi.html> on Apr. 8, 14, Nov. 11, 2006, 3 pages.
"Notice of Allowance", U.S. Appl. No. 13/655,386, Apr. 25, 2014, 6 pages.
"QPinchGesture Class Reference", Retrieved from <http://doc.qt.digia.com/4.6/qpinchgesture.html> on May 28, 2014, 2010, 6 pages.
Anson, "Pining for Windows Phone 7 controls? We got ya covered! [Announcing the first release of the Silverlight for Windows Phone Toolkit!]", Retrieved from <http://blogs.msdn.com/b/delay/archive/2010/09/16/pining-for-windows-phone-7-controls-we-got-ya-covered-announcing-the-first-release-of-the-silverlight-for-windows-phone-toolkit.aspx> on May 30, 2014, Sep. 16, 2010, 17 pages.
"Non-Final Office Action", U.S. Appl. No. 13/228,888, Feb. 10, 2014, 21 pages.
"Final Office Action", U.S. Appl. No. 13/118,321, Dec. 19, 2013, 30 pages.
"Final Office Action", U.S. Appl. No. 12/721,422, (Mar. 7, 2013), 10 pages.
"Final Office Action", U.S. Appl. No. 13/118,339, (Aug. 22, 2013), 21 pages.
"Final Office Action", U.S. Appl. No. 13/229,693, (Sep. 4, 2013), 23 pages.
"Final Office Action", U.S. Appl. No. 13/656,574, (Aug. 23, 2013), 20 pages.
"Non-Final Office Action", U.S. Appl. No. 12/721,422, (Oct. 1, 2012), 7 pages.
"Non-Final Office Action", U.S. Appl. No. 13/196,272, (Sep. 3, 2013), 5 pages.
"Notice of Allowance", U.S. Appl. No. 12/721,422, (Jul. 11, 2013), 9 pages.
"You've Got Mail 1.4 Build", retrieved from <http://www.fileshome.com/Shows_Animation_Sound_Automatic_N . . . > on Jan. 6, 2010, (Jun. 18, 2007), 2 pages.
Farrugia, Michael et al., "Cell Phone Mini Challenge: Node-Link Animation Award Animating Multivariate Dynamic Social Networks", *IEEE Symposium on Visual Analytics Science and Technology*, Columbus, OH, USA, Oct. 21-23, 2008, (Oct. 21, 2008), 2 pages.
Keranen, Jaakko "OpenGL-based User Interface Toolkit for Symbian Mobile Devices", *Master of Science Thesis, Tamere University of Technology, Department of Information Technology*, (Apr. 6, 2005), 88 pages.
"Final Office Action", U.S. Appl. No. 13/655,386, (Jun. 6, 2013), 34 pages.
"Final Office Action", U.S. Appl. No. 13/656,354, (Jun. 17, 2013), 14 pages.
"Final Office Action", U.S. Appl. No. 13/657,646, (May 6, 2013), 12 pages.
"Non-Final Office Action", U.S. Appl. No. 13/118,321, (Jun. 10, 2013), 32 pages.
"Non-Final Office Action", U.S. Appl. No. 13/118,333, (Jul. 5, 2013), 18 pages.
"Notice of Allowance", U.S. Appl. No. 12/977,584, (Jun. 19, 2013), 5 pages.
"Notice of Allowance", U.S. Appl. No. 13/492,495, (Apr. 26, 2013), 5 pages.
"Notice of Allowance", U.S. Appl. No. 13/655,390, (May 24, 2013), 5 pages.
Kurdi, Samer "Acer GridVista: snap your windows to pre-defined sections on your screen(s)", Retrieved from <http://www.freewaregenius.com/acer-gridvista-snap-your-windows-to-pre-defined-sections-of-your-screens/> on Jun. 30, 2013, (Jan. 19, 2010), 6 pages.
Kurdi, Samer "WinSplit Revolution", Retrieved from <http:/www.freewaregenius.com/winsplit-revolution/> on Jun. 30, 2013, (Aug. 22, 2007), 4 Pages.
"Final Office Action", U.S. Appl. No. 13/224,258, Jul. 18, 2014, 39 pages.
"Final Office Action", U.S. Appl. No. 13/228,876, Jul. 18, 2014, 15 pages.
"First Examination Report", NZ Application No. 618269, May 20, 2014, 2 pages.
"First Examination Report", NZ Application No. 618284, May 20, 2014, 2 pages.
"Foreign Office Action", CN Application No. 201180071186.4, Jun. 13, 2014, 12 pages.
"Non-Final Office Action", U.S. Appl. No. 13/118,288, Jul. 2, 2014, 17 pages.
"Non-Final Office Action", U.S. Appl. No. 13/229,693, Jun. 20, 2014, 25 pages.
"Non-Final Office Action", U.S. Appl. No. 13/229,702, Jul. 3, 2014, 28 pages.
"Non-Final Office Action", U.S. Appl. No. 13/657,621, Jul. 18, 2014, 22 pages.
"Non-Final Office Action", U.S. Appl. No. 13/657,646, Aug. 12, 2014, 14 pages.
"Notice of Allowance", U.S. Appl. No. 13/118,204, Jul. 8, 2014, 8 pages.
"Final Office Action", U.S. Appl. No. 13/345,383, Jul. 25, 2014, 26 pages.
"Foreign Office Action", CN Application No. 201210317470.1, Jun. 5, 2014, 12 pages.
"Notice of Allowance", U.S. Appl. No. 13/229,556, Sep. 2, 2014, 12 pages.

(56) References Cited

OTHER PUBLICATIONS

"Notice of Allowance", U.S. Appl. No. 13/229,709, Sep. 2, 2014, 4 pages.
"Final Office Action", U.S. Appl. No. 13/228,888, Oct. 24, 2014, 29 pages.
"Final Office Action", U.S. Appl. No. 13/228,945, Oct. 23, 2014, 24 pages.
"Foreign Office Action", CN Application No. 201110429183.5, Aug. 21, 2014, 13 Pages.
"Foreign Office Action", CN Application No. 201110454251.3, Oct. 21, 2014, 13 Pages.
"Non-Final Office Action", U.S. Appl. No. 12/983,106, Sep. 10, 2014, 19 pages.
"Non-Final Office Action", U.S. Appl. No. 14/089,149, Nov. 3, 2014, 8 pages.
"Notice of Allowance", U.S. Appl. No. 13/656,574, Sep. 23, 2014, 7 pages.
"Supplemental Notice of Allowance", U.S. Appl. No. 13/118,204, Sep. 10, 2014, 2 pages.
"Supplemental Notice of Allowance", U.S. Appl. No. 13/118,204, Oct. 2, 2014, 2 pages.
"Supplemental Notice of Allowance", U.S. Appl. No. 13/118,204, Oct. 23, 2014, 3 pages.

* cited by examiner

ARRANGING TILES

RELATED APPLICATION

This application is a continuation of and claims priority under 35 U.S.C. §120 to U.S. patent application Ser. No. 13/224,258, filed on Sep. 1, 2011, the disclosure of which is incorporated by reference herein in its entirety.

BACKGROUND

Many conventional application-launching interfaces permit users to launch applications by selecting an icon or label associated with the application. These interfaces often include these icons or labels in a flat list, a file-based hierarchy, or grouped by page. If a user wishes to find and select an application, the user scrolls through the list, searches through levels within the hierarchy, or flips through the pages until the user finds the icon or label. This process can be tedious for users, especially if the interface has many applications from which to choose.

To address this tedium, some application-launching interfaces permit users to move these icons or labels within a flat list, a file-based hierarchy, or page-oriented groups. This can aid users, as often-used applications can be oriented at the top of the flat list, at a higher level of the hierarchy, or in the first or second page of the page-oriented groups.

Moving icons or labels within these application-launching interfaces, however, can be tedious and confusing. A user wishing to move an icon from a sixth page of icons, for example, may need to select the icon, select to move to a desired other page, once in that desired page drop the icon at the end of the page, move other icons in that desired page around manually to a desired arrangement within the page, and then go back to the sixth page to manually arrange the icons remaining in the sixth page.

SUMMARY

This document describes techniques and apparatuses for arranging tiles. These techniques and apparatuses enable users to quickly and easily arrange tiles within an interface, such as an application-launching interface. In some cases, users may arrange tiles in an interface with as little as one continuous gesture.

This summary is provided to introduce simplified concepts for arranging tiles that are further described below in the Detailed Description and/or shown in the Figures. This summary is not intended to identify essential features of the claimed subject matter, nor is it intended for use in determining the scope of the claimed subject matter. The term "techniques" as used herein can include devices, systems, apparatuses, operations, and/or methods as permitted by the context in which the term is used.

BRIEF DESCRIPTION OF THE DRAWINGS

Embodiments for arranging tiles are described with reference to the following drawings. The same numbers are used throughout the drawings to reference like features and components.

DETAILED DESCRIPTION

Overview

This document describes techniques for arranging tiles. These techniques enable users to better use their selection interfaces through simple and easy arranging of tiles within these interfaces. For application-launching interfaces, for example, the techniques permit users to arrange tiles within groups and across groups intuitively and with little effort. Not only can moving tiles be made easier by the techniques, the techniques may also automatically reflow the array of tiles into which, or from which, a tile is moved.

While techniques for arranging tiles can be implemented in any number of different devices, systems, environments, and/or configurations, example embodiments for arranging tiles are described in the context of the following example devices, systems, and methods.

Example System

Figure 1:
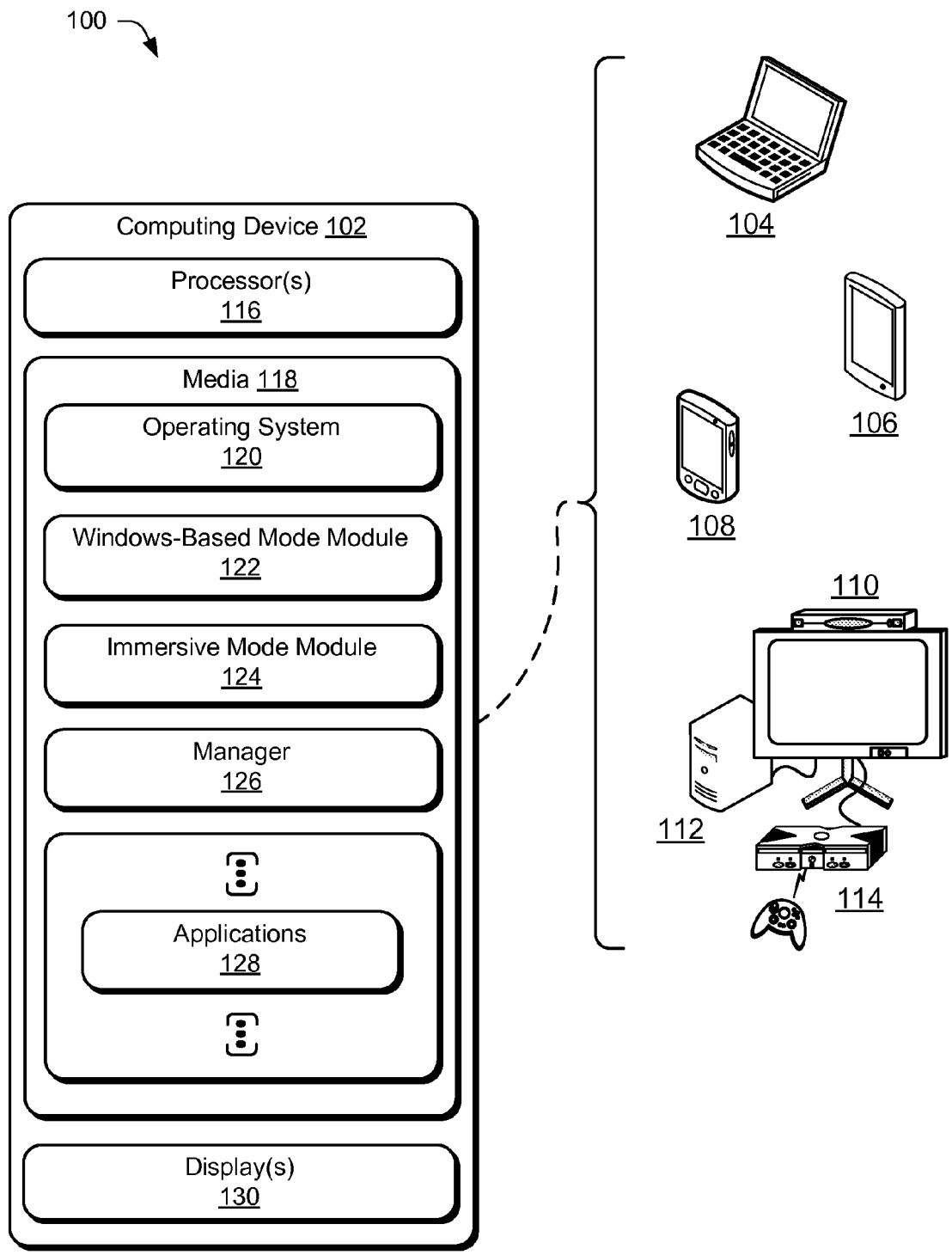
FIG. 1 illustrates an example system in which techniques for arranging tiles can be implemented.

FIG. 1 illustrates an example system 100 in which techniques for arranging tiles can be embodied. System 100 includes a computing device 102, which is illustrated with six examples: a laptop computer 104, a tablet computer 106, a smart phone 108, a set-top box 110, a desktop computer 112, and a gaming device 114, though other computing devices and systems, such as servers and netbooks, may also be used.

Computing device 102 includes computer processor(s) 116 and computer-readable storage media 118 (media 118). Media 118 includes an operating system 120, windows-based mode module 122, immersive mode module 124, manager 126, and applications 128. Computing device 102 also includes or has access to one or more displays 130, four examples of which are illustrated in FIG. 1.

Windows-based mode module 122 is capable of presenting applications 128 through windows having frames. These frames may provide controls through which to interact with an application and/or controls enabling a user to move and size the window.

Immersive mode module 124 provides a mode by which a user may view and interact with applications 128. In some embodiments, this mode presents content of, and enables interaction with, applications with little or no window frame and/or without a need for a user to manually size or position content. This mode can be, but is not required to be, hosted and/or surfaced without use of a typical desktop (e.g., windows-based) mode. Thus, in some cases immersive mode module 124 presents an immersive mode that is not a window (even one without a substantial frame) and precludes usage of desktop-like displays (e.g., a taskbar). Further still, in some embodiments this immersive mode is similar to an operating system in that it is not closeable or capable of being uninstalled.

Manager 126 provides an application-selection interface that permits selection to launch, present, or revisit applications 128, whether of windows-based or immersive modes, and itself can be presented in a windows-based or immersive mode. Manager 126 also enables users to arrange tiles within the application-selection interface. Note that while system 100 and manager 126 are described in the context of application-selection interfaces, manager 126 may operate to arrange tiles, icons, or labels in other contexts, such as file systems, image retrieval systems, document retrieval systems, and the like.

Operating system 120, mode modules 122 and 124, and manager 126 can be separate from each other or combined or integrated in some form. Thus, in some cases operating system 120 includes mode modules 122 and 124 and manager 126.

Example Methods

This document now describes example methods for arranging tiles. These methods are shown as sets of blocks that specify operations performed, but are not necessarily limited to the order shown. Portions of the following discussion reference system 100 of FIG. 1, reference to which is made for example only.

Figure 2:
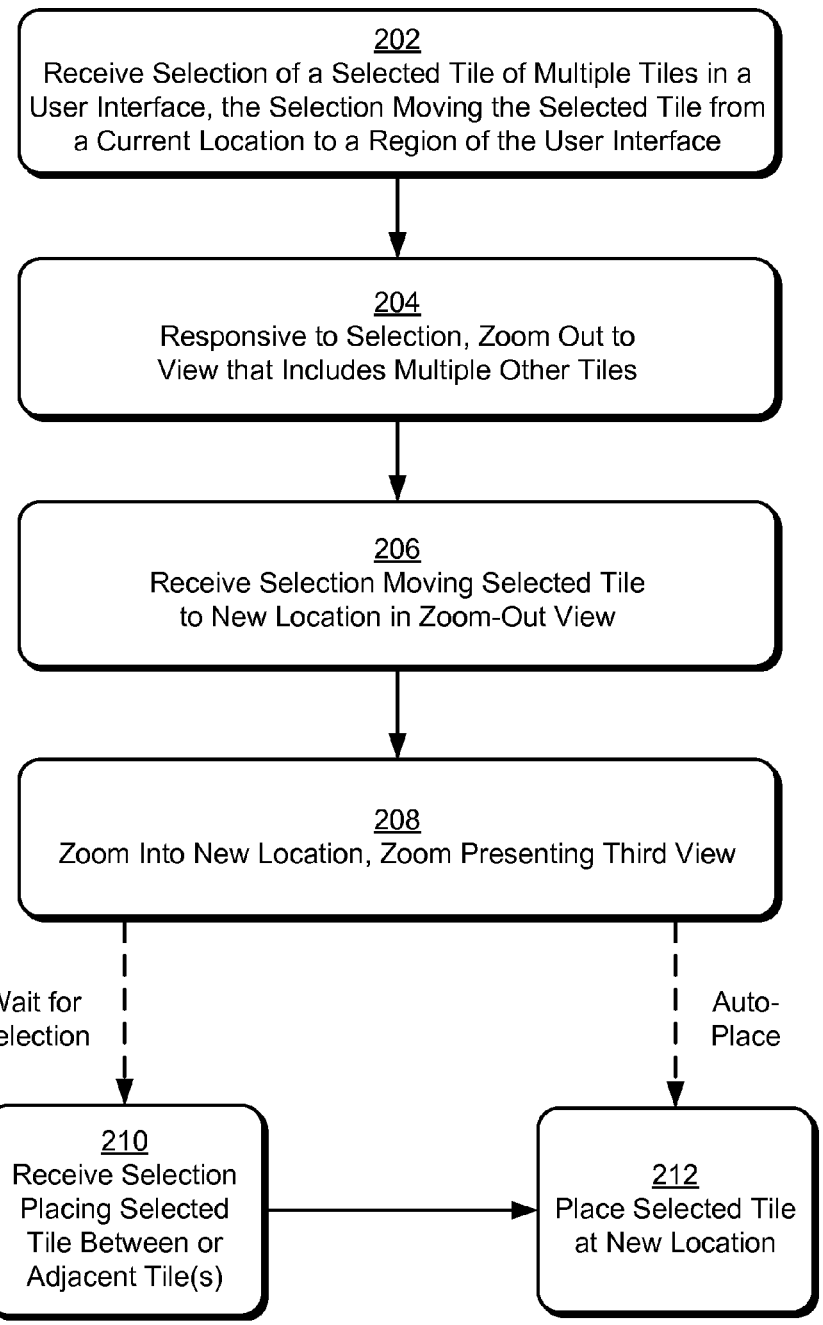
FIG. 2 illustrates an example method for arranging tiles.

FIG. 2 depicts a method 200 for arranging tiles, including ways in which to move a tile within or between groups of tiles. Block 202 receives selection of a selected tile of multiple tiles displayed in a first view in a user interface. This selection can move the selected tile from a current location within the multiple tiles to a region of the user interface.

Before this document proceeds to illustrate an example user interface, note that this selection can be through various manners, including single or multiple gestures. Gestures can be received through a mouse pointer, touch gestures made through a touch-sensitive display that displays the interface, and motion-sensitive gestures, such as through motion-detection device used in some gaming systems, to name just a few.

The interface in which the multiple tiles are displayed, as noted in part above, can be of various types, such as application-selecting interfaces and file systems. Thus, tiles in an interface may represent applications, images, files, and the like. Further, tiles are not necessarily passive or flat but may instead display content, such as from the application itself or from a remote source associated with the application even if the application is not itself executing.

Figure 3:
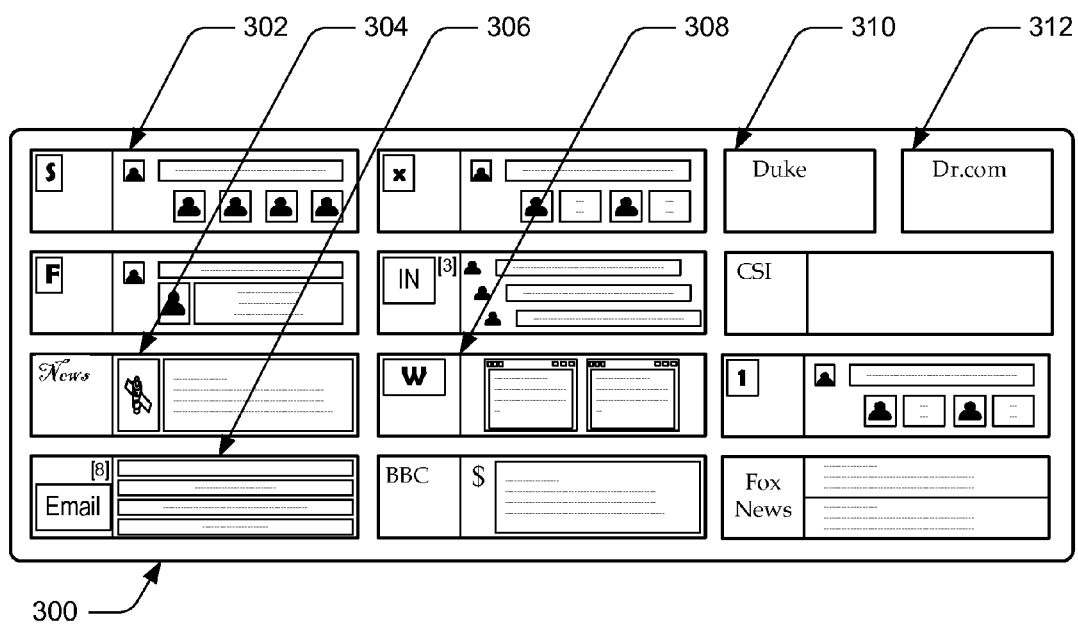
FIG. 3 illustrates an example application-launching interface displaying multiple tiles associated with multiple applications.

By way of illustration, consider an example application-selection interface 300 shown in FIG. 3. Application-selection interface 300 displays multiple tiles associated with multiple applications. Each tile is associated with an application and indicates this association, such as with a graphic or textual descriptor. Applications are selectable through these tiles, such as through a mouse click or gesture (e.g., through a touch-screen implementation of display 130). In some cases, however, the applications are selectable as a group and/or through a hot key or other selection manner other than directly through a tile.

Manager 126 of FIG. 1 provides interface 300 and includes thirteen selectable tiles associated with thirteen applications. Tiles 302, 304, and 306 are large tiles associated with web-enabled, content-oriented applications, tile 308 is a large tile associated with a local, word-processing application, and tiles 310 and 312 are small tiles associated with web-enabled content-oriented applications.

Figure 4:
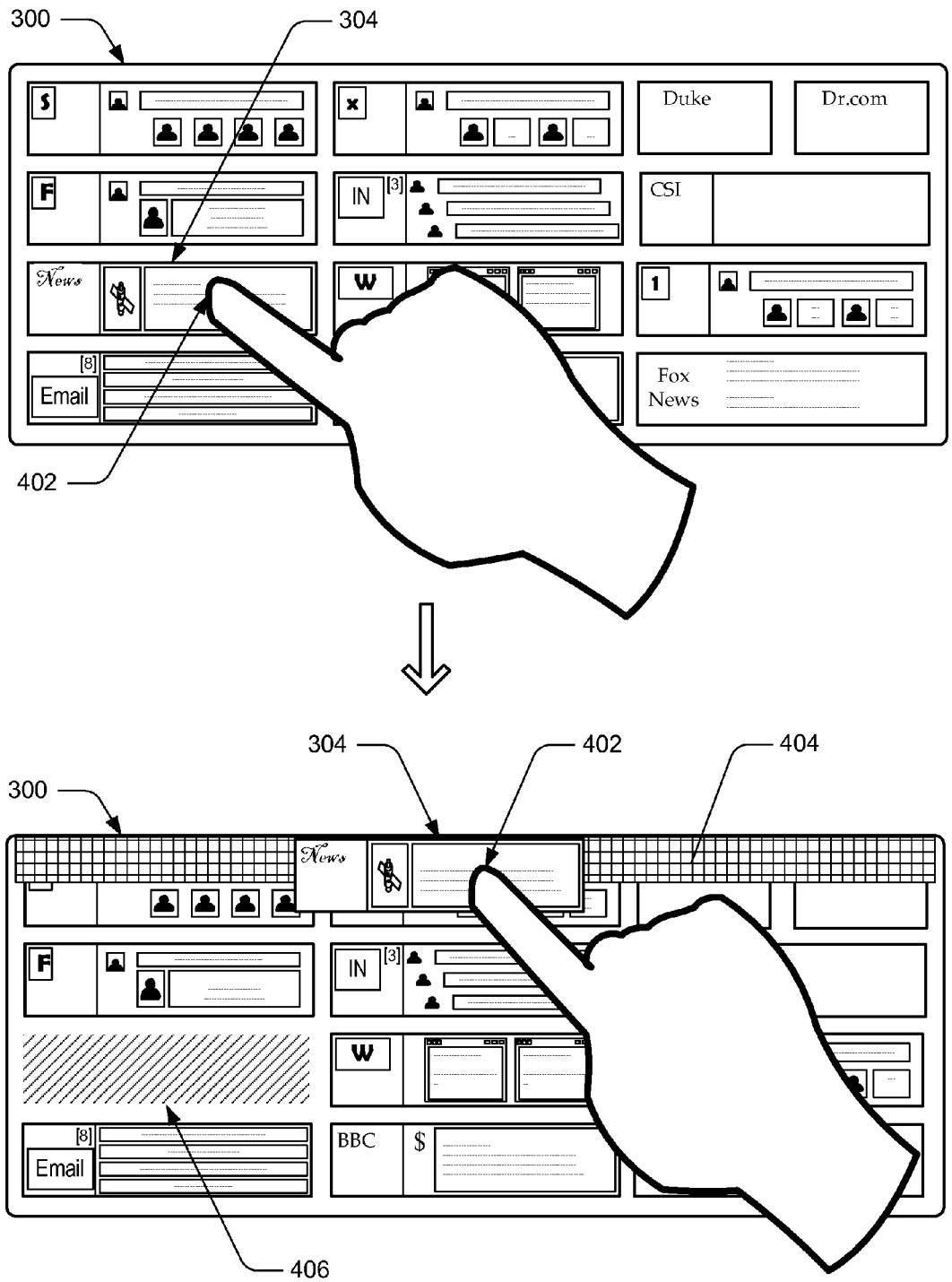
FIG. 4 illustrates the example application-launching interface of FIG. 3 with an example gesture selection of a tile, the gesture moving the tile to a region of the interface.

As noted above, block 202 can receive a selection through a touch gesture, such as a touch gesture 402 illustrated in FIG. 4. This gesture 402 selects and moves tile 304 to top-edge region 404. This region can be an area or edge within interface 300. While not required, use of an upward or downward selection (e.g., gesture 402 of FIG. 4) can be useful to differentiate this type of gesture (up and down, rather than left and right) from other gestures. Here up and down motions are used to arrange tiles while left and right motions are used generally to pan or scroll through tiles. This differentiation aids users in their intuitive use of the interface and, in some cases, negates the need to describe or clutter the interface with instructions or information. Note that top-edge region 404 may be indicated to a user or not indicated; here it is shown for illustration purposes. Manager 126 may proceed immediately to block 204 when a portion or contact point of a gesture is within a region or wait for a dwell or hover in the region, such as waiting until gesture 402 hovers in top-edge region 404 before proceeding to block 204.

Block 204, responsive to the selection, zooms out from the first view to a second view, the second view including multiple other tiles not displayed in the first view. As noted in part above, the gesture or other selection can be continuous or otherwise. A multiple-gesture example is provided elsewhere herein.

Figure 5:
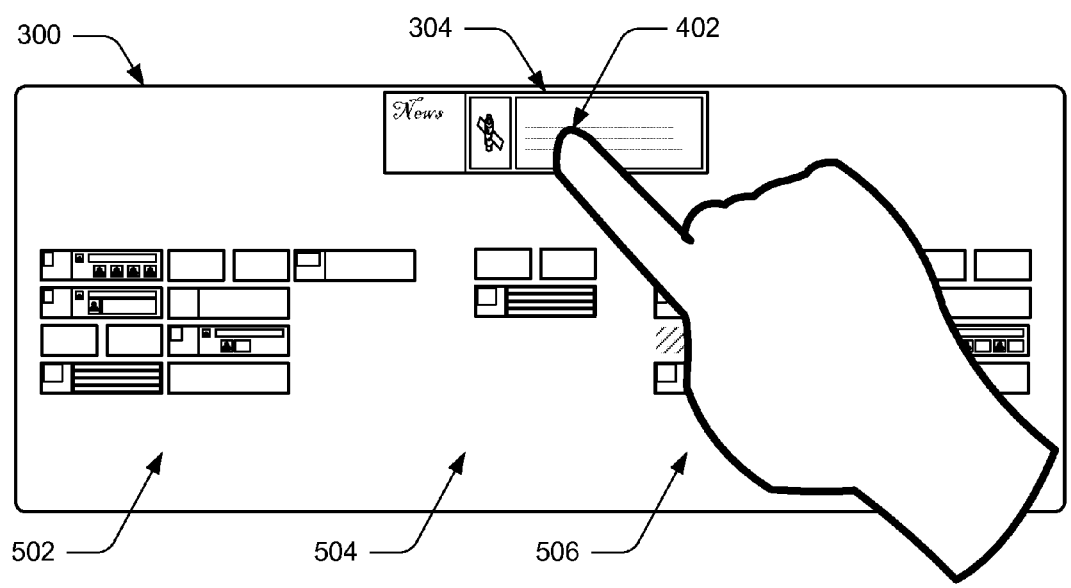
FIG. 5 illustrates the interface of FIG. 3 having multiple different groups of tiles at lower resolution.

Continuing with the ongoing example, assume that gesture 402 is continuous, meaning that gesture 402 is a single gesture maintained at least during blocks 202, 204, and 206 of method 200. For the continuous-gesture case, manager 126 "sticks" tile 304 to a selector (e.g., a finger or stylus) that makes gesture 402. Thus, while gesture 402 is maintained and tile 304 sticks to the finger shown in FIG. 4, manager 126 zooms out to present multiple other tiles not presented in the first view. This second view is illustrated in FIG. 5, which shows interface 300 having multiple different groups 502, 504, and 506 of tiles at lower resolution. Group 506 include tiles shown in FIGS. 3 and 4, though smaller (and partially obscured). Tile 304 is shown at full size, though it can be shrunk to correspond to the resolution of the tiles in groups 502, 504, and 506.

Block 206 receives selection moving the selected tile to a new location in the second view. This selection can be a drop of the selected tile to the new location or a dwell or hover over the new location, such as when a single, continuous gesture is used. This new location can be addressed by manager 126 in different ways. In one case, method 200 automatically places the selected tile at the new location and without further selection. In another case, method 200 waits for a further selection. In both cases, however, method 200 can zoom in to show multiple tiles at a higher resolution at block 208.

Block 208 zooms into the new location, the zooming in presenting a third view. The third view includes the new location and one or more of the multiple other tiles. In cases where method 200 automatically places the selected tile without further selection, the selected tile is shown placed within the group.

In cases where method 200 does not automatically place the selected tile at the new location but instead waits for a further selection, the selected tile is not shown within the group, though it may be shown outside or imposed over the group.

Figure 6:
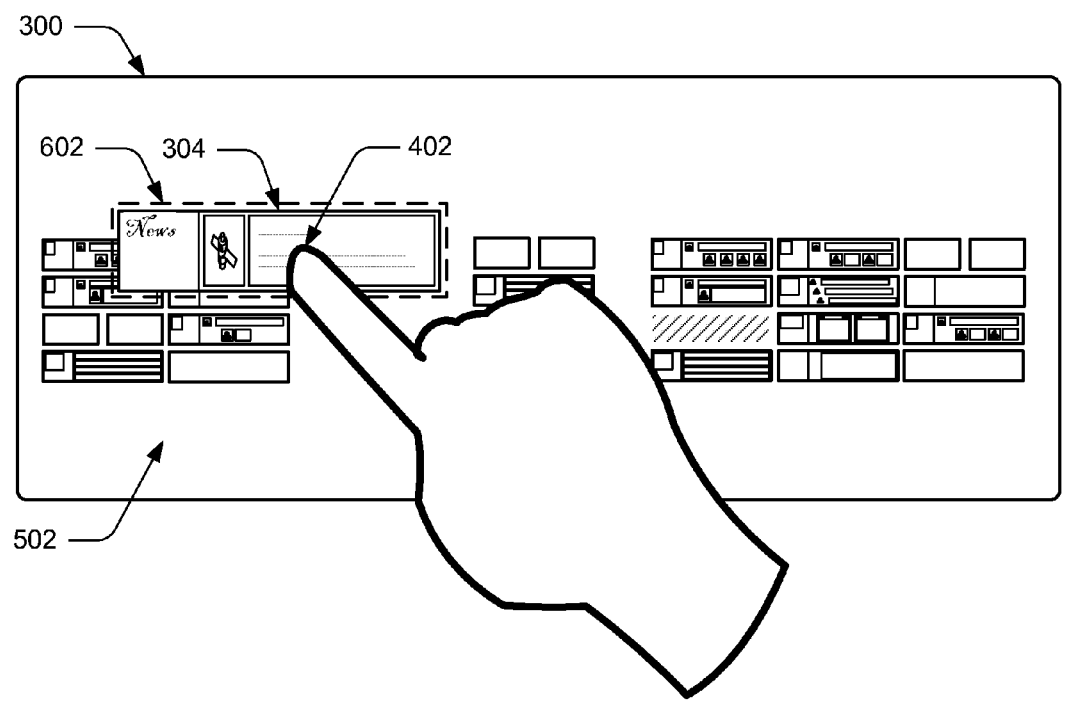
FIG. 6 illustrates a later portion of the gesture of FIG. 4, the later portion of the gesture moving the selected tile to a location proximate to tiles within one of the groups shown in FIG. 5.

In the ongoing example, manager 126 receives another portion of gesture 402, this portion selecting to move tile 304 to a location 602 proximate to tiles within group 502 of FIG. 5. The result of this movement is shown in FIG. 6.

Figure 7:
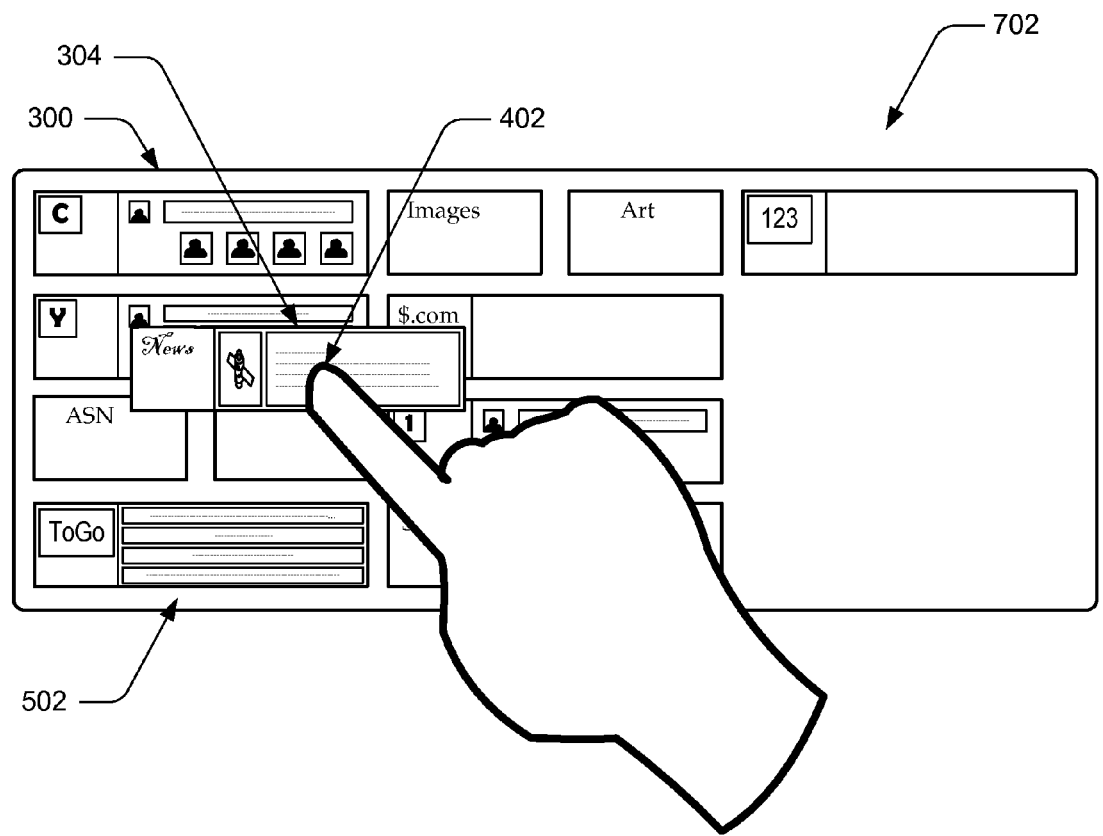
FIG. 7 illustrates a view zooming in to show, at a higher resolution, the multiple tiles of the group shown in FIG. 6.

In response, manager 126 zooms in to show the multiple tiles of group 502 and selected tile 304 at higher-resolution view 702, which is illustrated in FIG. 7. In this, case tile 304 is shown still connected to a selector of gesture 402 and imposed over group 502. Thus, in this case manager 126 zooms in to show tiles in the group within which the new location resides. Manager 126 may then wait for a precise location at which to place the selected tile.

Method 200 proceeds to block 210 along the "Wait for Selection" path if awaiting a precise location within the group of tiles or to block 212 along the "Auto-Place" path if manager 126 places the selected tile at the new location in the group without further selection.

Block 210 receives a third selection, the third selection placing the selected tile between or adjacent to one or more of the multiple tiles. Manager 126 can indicate through feedback, prior to receiving the third selection, valid locations between or adjacent to the one or more of the multiple tiles at which the selected tile can be placed, either responsive to a selected tile being moved around the group, such as altering an appearance of tiles (e.g., tilting the tiles) above and/or below the location at which the selected tile currently resides (e.g., the 304's location in group 502 of FIG. 7). In other cases manager 126 indicates valid locations generally, such as by shading or coloring a space adjacent to or between tiles.

Block 212 places the selected tile at the new location. As noted, this new location can be received at block 206 or 210.

Figure 8:
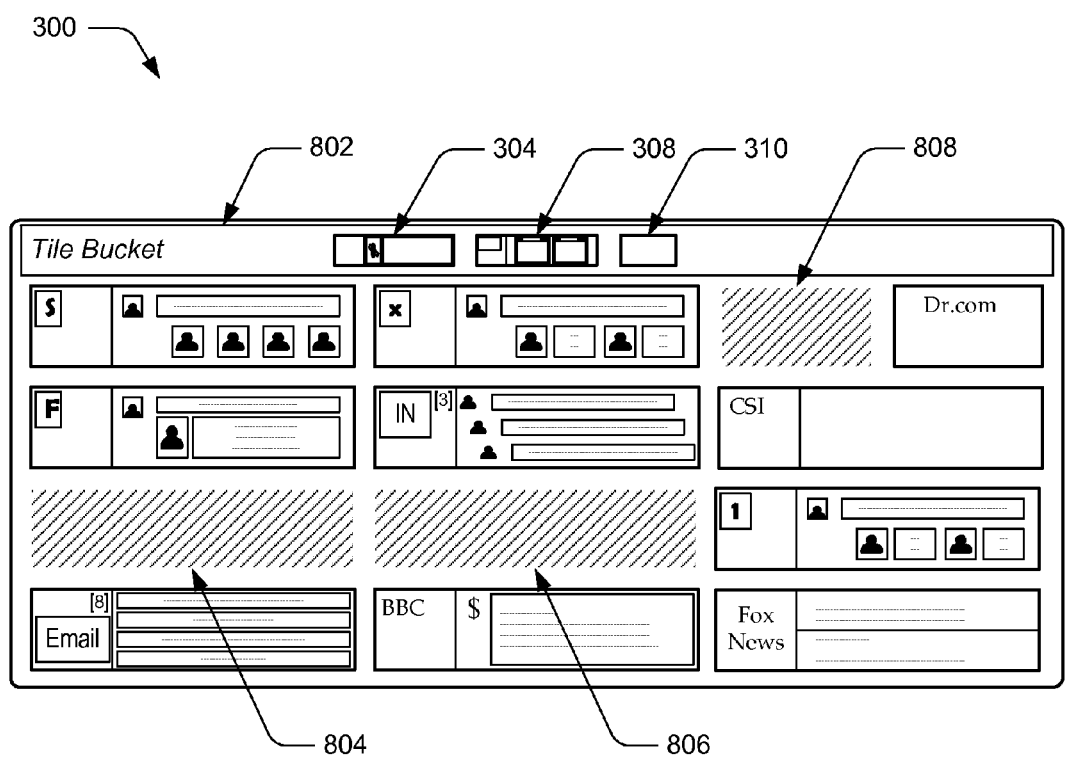
FIG. 8 illustrates a selection to move a tile from a current location to a region of a user interface having a marked area.

As noted above at block 202, a selection moving a tile from a current location to a region of a user interface may include a marked area within the user interface. This is illustrated at FIG. 8 at marked area 802. While not required, this marked area 802 indicates, with text ("Tile Bucket") that tiles in this region may later be moved within this or to other groups of tiles. Here assume that tiles 304, 308, and 310 are selected and placed in the marked area 802, each with separate selections (e.g., three mouse clicks or drag-and-drop gestures). In response, manager 126 indicates that these tiles are removed from their current locations with shaded blocks at the selected tiles' original locations at 804, 806, and 808, respectively. Manager 126 also indicates that the selected tiles are ready to be moved by showing the tiles (here small versions of the tiles) within marked area 802. Method 200 then enables movement of each selected tile one-by-one or at once, such as by multiple or a single iteration of blocks 204, 206, 208, and either 212 or 210 and 212. If moved at once, one of the selected tiles is moved to the new location and the others of the tile are moved adjacent to the new location. By so doing, the techniques permit users to move multiple tiles within or across groups quickly and easily.

Either separate or in conjunction with method 200, the techniques may automatically reflow tiles of a group in response to a tile being moved, as is described in method 900 below.

Figure 9:
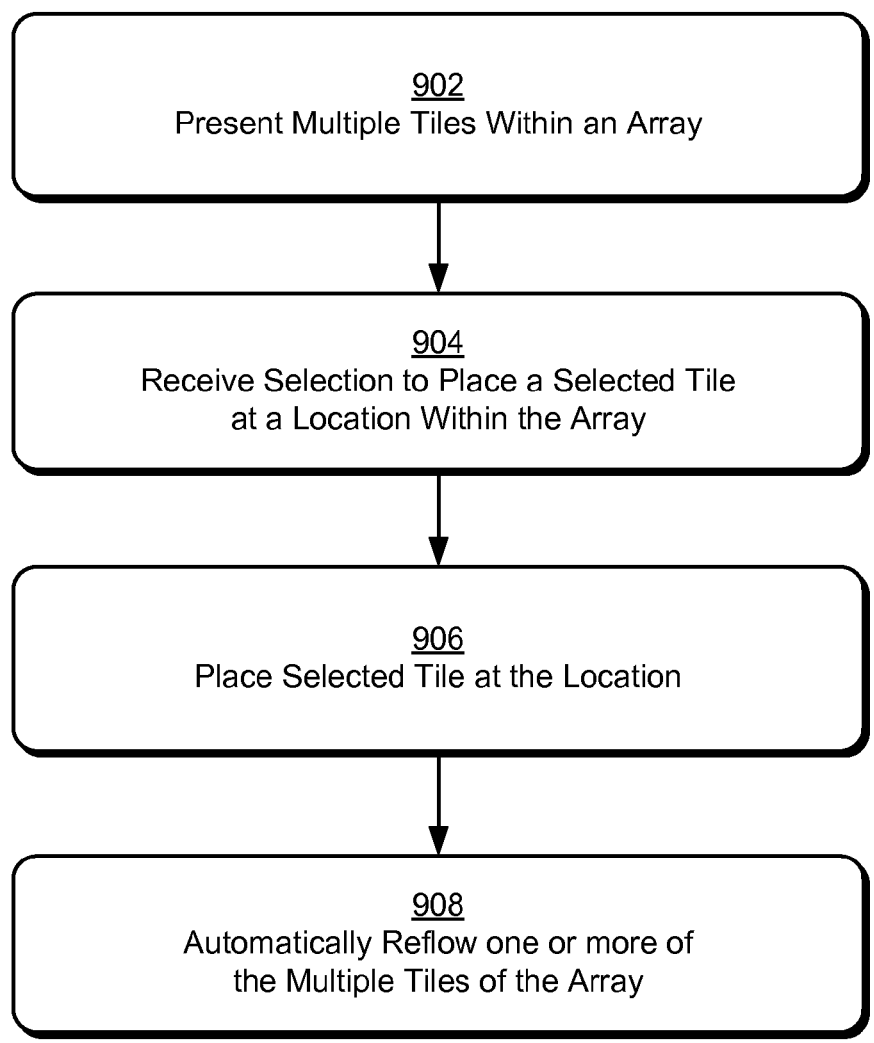
FIG. 9 illustrates an example method for automatically reflowing tiles, which may be used separate from or in conjunction with the method of FIG. 2.

FIG. 9 depicts method 900 for arranging tiles, including automatically reflowing tiles. Block 902 presents multiple tiles within an array. The array can be any one of the groups set forth above as well as other arrangements of tiles, such a group having a circular or three-dimensional pattern (e.g., layers of columns and rows). In the ongoing example, the array includes multiple columns and rows, such as those shown in FIG. 3, groups 502 or 506 of FIG. 5, or group 1002 of FIG. 10.

As part of reflowing tiles within an array, various rules may be used, such as top-to-bottom and then left-to-right. Other rules may instead be used, such as right-to-left or bottom-to-top (e.g., in cultures where language is not commonly arranged left-to-right). In an ongoing example, an array is ordered to have superior and subordinate locations. This example array has a left-most column with locations superior to locations within columns arranged right of the left-most column, and a top-most row of each column having locations superior to locations within each column arranged below the top-most row.

Block 904 receives selection to place a selected tile at a location within the array and at which a current tile of the multiple tiles resides. These tiles, as noted, can be selected and placed as described in method 200 or otherwise, such as through auto-scrolling within a same array or across a different array by dragging-and-dropping a tile from a location off screen to the selected location.

Further, prior to placing the tile at the selected location, manager 126 can indicate the location at which the selected tile will be placed, such as through tilting an immediately superior tile or a current tile in the location responsive to a dwell, hover, or movement over the location of the selected tile. Manager 126 may also indicate the location by previewing the arrangement of the array should the tile be placed at the location and the array of tiles be reflowed based on the placement.

Figure 10:
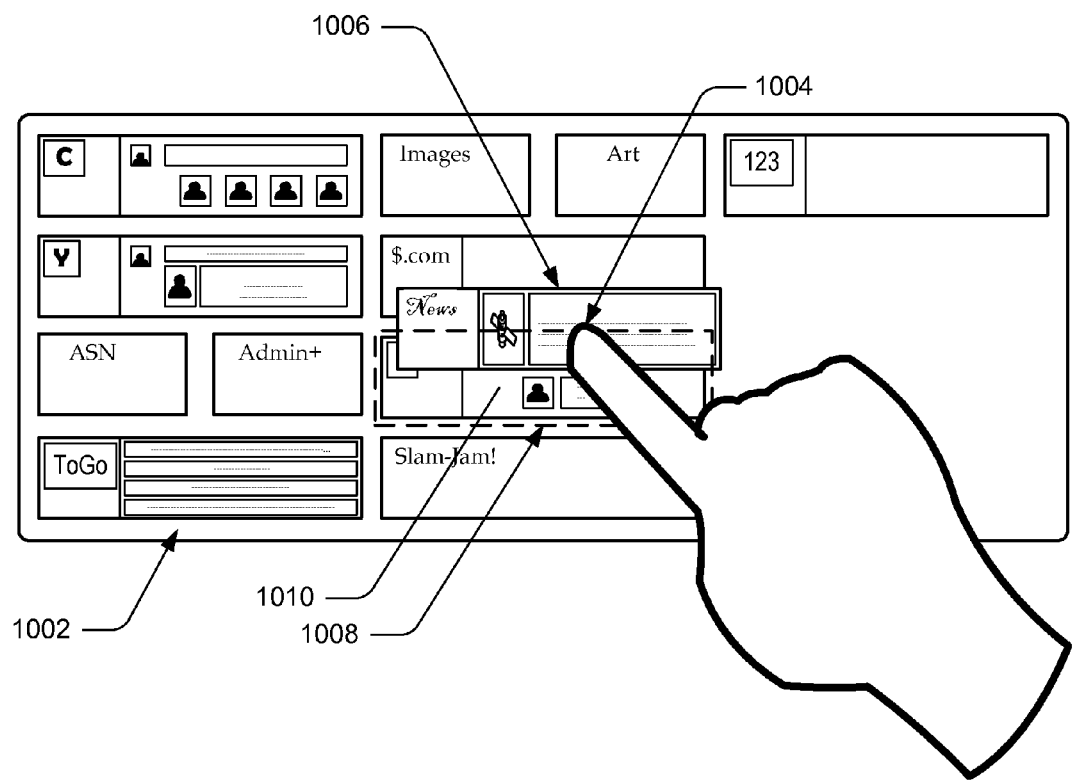
FIG. 10 illustrates an array of tiles having multiple columns and rows.

By way of example, consider FIG. 10, which illustrates placement, through a gesture 1004, of tile 1006 at location 1008. Note that tile 1010 currently resides at location 1008.

Block 906 places the selected tile at the location in the array. Method 900 may perform block 906 before, after, or in conjunction with block 908. Thus, the reflow may be shown prior to, after, or at the same time as placement of the selected tile at the location.

Block 908 automatically reflows one or more of the multiple tiles within the array, the reflow moving at least the current tile to a subordinate location in the array. Manager 126 reflows tiles of the array in response to the selection to place the tile at the location. By so doing, users need not take the time or effort to manually arrange tiles in the array.

In the ongoing example, the array is ordered by column, top-to-bottom, and then row, left-to-right. For this order, manager 126 moves the current tile and any tiles subordinate to the current tile down their respective columns unless no lower location exists in their respective columns and, if no lower location exists in their respective columns, moves the tile over from its respective columns to a column arranged to the right of its respective column.

Figure 11:
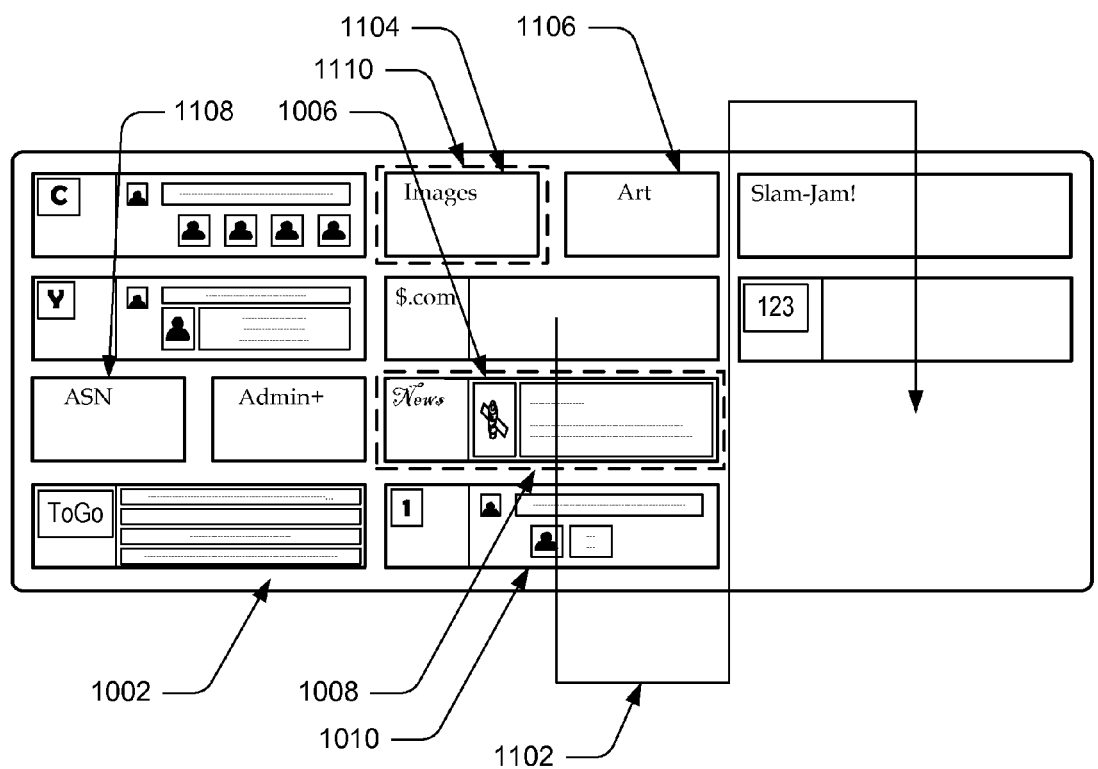
FIG. 11 illustrates an automatic reflow of tiles of the array of FIG. 10 in response to movement of a tile.

The result is shown in FIG. 11. Manager 126 places tile 1006 at location 1008 and reflows tiles of group 1002. The movement of the automatic reflow is shown with reflow path 1102, which illustrates the top-to-bottom, then left-to-right, and then top-to-bottom reflow of tiles.

In addition to automatically reflowing an array due to placing a selected tile within an array, the techniques may also reflow tiles responsive to removing a tile from an array (whether a different array or the same array into which the tile is moved). By way of example, consider again FIG. 4, which illustrates selection of tile 304 for removal from interface 300. In FIG. 4, the location from which tile 304 is removed is shown with a hashed-line box 406. The techniques, however, may reflow the other tiles of interface 300 in FIG. 4 responsive to moving tile 304. In such a case, the reflow can be immediately in response to selection of a tile, such as at block 204, or after placement of the selected tile to its new location at block 212.

Figure 12:
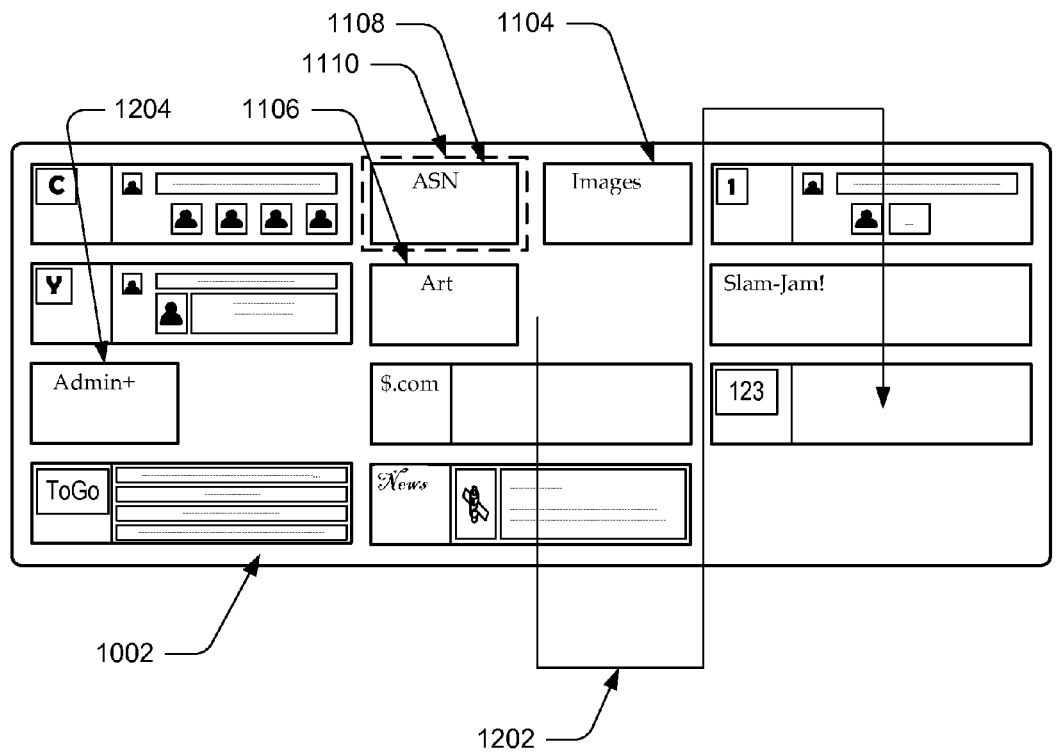
FIG. 12 illustrates an automatic reflow of the array of FIG. 10 and a sub-array in response to movement of a small tile within the sub-array.

Whether automatically reflowing tiles in an array responsive to removing or adding in a tile, the techniques may also reflow sub-arrays within an array. Consider again FIG. 11, which shows small tiles 1104, 1106, and 1108. Small tile 1104 is currently at a location 1110. In response to a selection to move small tile 1108 to location 1110, manager 126 reflows the small tiles within the sub-array made up of the small tiles. This is illustrated in FIG. 12, which shows the result of manager 126 automatically placing small tile 1108 at location 1110, moving small tile 1104 right, and then moving small tile 1106 down (and then all of the subordinate tiles as shown by path 1202).

As noted above, the techniques may automatically reflow an array in response to a tile be removed from a location in an array and/or sub-array. As shown in FIG. 12, tile 1108 was moved. In response manager 126 moved a previously subordinate tile, tile 1204, into tile 1108's original location. The techniques may do so in an opposite manner as noted for adding tiles, such as a reverse-direction of path 1102 or 1202. Thus, should tile 1106 be moved to a different array, deleted, or otherwise moved, manager 126 automatically reflows tiles in group 1002 of FIG. 12 to move into the location originally occupied by tile 1106 a subordinate tile (in this case with a large tile).

In some cases a user may decide not to move a tile. Consider a case where a user moves a selected tile to a location in an array. Here assume that manager 126 previews what the array will look like if the selected tile is added at that location. The user, in response, decides against moving the tile. The techniques permit the user to quickly and easily revert the moved tile back to its original location. The user may indicate this decision to abandon moving the tile in various ways, such as through selecting a hot key or dropping the tile into a particular region of a user interface, outside of the array or the interface, or at a location not indicated as valid within the interface. Manager 126 may reinforce that the techniques are reverting the tile back to its original location, such as by presenting the selected tile back at its original location. If the original location is not shown in the current view, manager 126 automatically presents a prior view showing the original location.

The preceding discussion describes methods in which the techniques may operate to arrange tiles. Aspects of these methods may be implemented in hardware (e.g., fixed logic circuitry), firmware, software, manual processing, or any combination thereof. A software implementation represents program code that performs specified tasks when executed by a computer processor. The example methods can be performed through computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing mode by multiple computing devices. Further, the features described herein are platform-independent and can be implemented on a variety of computing platforms having a variety of processors.

By way of example, these techniques may be embodied on one or more of the entities shown in system 100 of FIG. 1 and/or example device 1300 described below, which may be further divided, combined, and so on. Thus, system 100 and/or device 1300 illustrate some of many possible systems or apparatuses capable of employing the described techniques. The entities of system 100 and/or device 1300 generally represent software, firmware, hardware, whole devices or networks, or a combination thereof. In the case of a software implementation, for instance, the entities (e.g., manager 126, mode modules 122 and 124) represent program code that performs specified tasks when executed on a processor (e.g., processor(s) 116). The program code can be stored in one or more computer-readable memory devices, such as computer-readable storage media 118 or computer-readable media 1314 of FIG. 13.

Example Device

Figure 13:
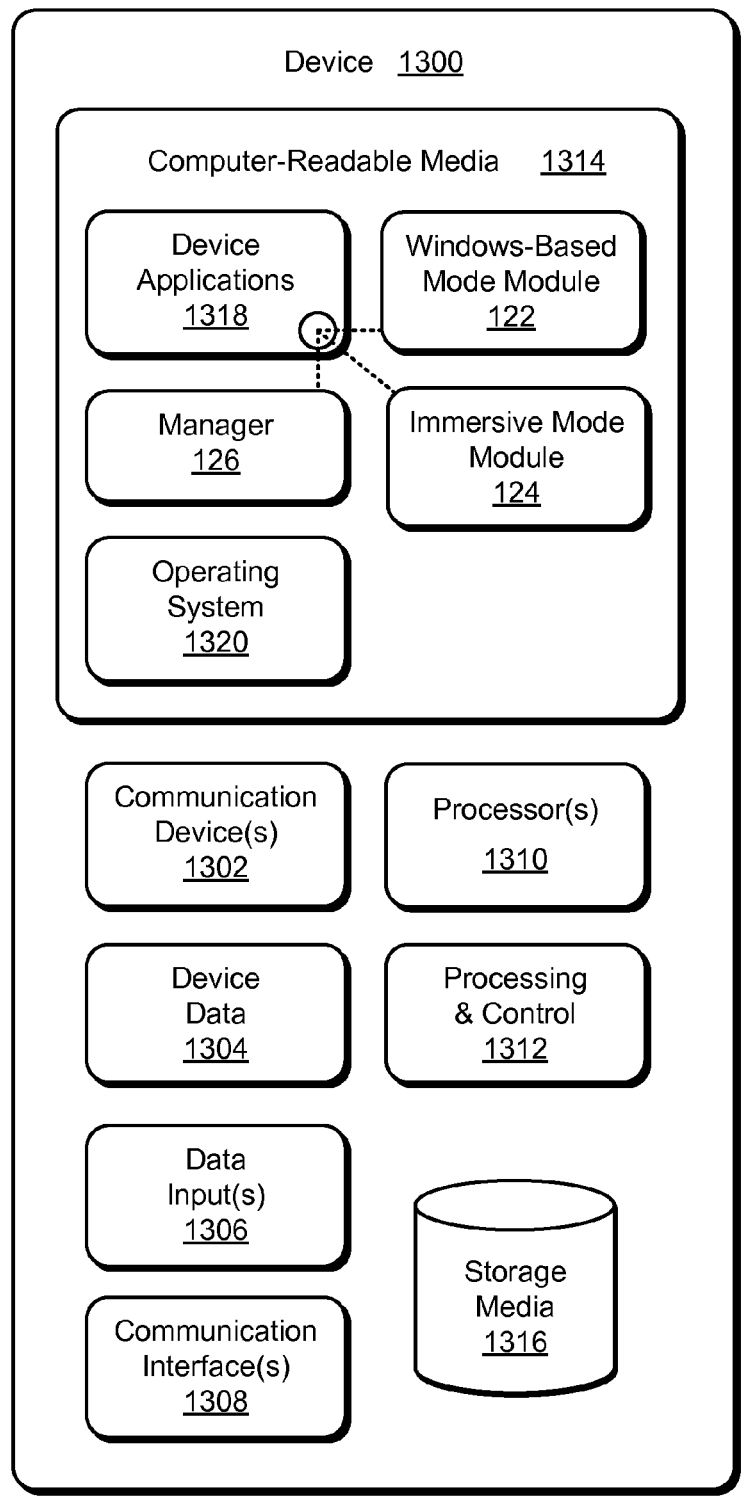
FIG. 13 illustrates an example device in which techniques for arranging tiles can be implemented.

FIG. 13 illustrates various components of an example device 1300 that can be implemented as any of the devices, or services and operations implemented by the devices, described with reference to the previous FIGS. 1-12. In some embodiments, device 1300 can be implemented as one or a combination of a wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 1300 may also be associated with a user (e.g., a person) and/or an entity that operates the device such that a device describes logical devices that include users, software, firmware, and/or a combination of devices.

Device 1300 includes communication devices 1302 that enable wired and/or wireless communication of device data 1304 (e.g., received data, data that is being received, data scheduled for broadcast, data packets of the data, etc.). The device data 1304 or other device content can include configuration settings of the device, media content stored on the device, and/or information associated with a user of the device. Media content stored on device 1300 can include any type of audio, video, and/or image data. Device 1300 includes one or more data inputs 1306 via which any type of data, media content, and/or inputs can be received, such as user-selectable inputs, messages, music, television media content, recorded video content, and any other type of audio, video, and/or image data received from any content and/or data source.

Device 1300 also includes communication interfaces 1308, which can be implemented as any one or more of a serial and/or parallel interface, a wireless interface, any type of network interface, a modem, and as any other type of communication interface. The communication interfaces 1308 provide a connection and/or communication links between device 1300 and a communication network by which other electronic, computing, and communication devices communicate data with device 1300.

Device 1300 includes one or more processors 1310 (e.g., any of microprocessors, controllers, and the like), which process various computer-executable instructions to control the operation of device 1300 and for arranging tiles. Alternatively or in addition, device 1300 can be implemented with any one or combination of hardware, firmware, or fixed logic circuitry that is implemented in connection with processing and control circuits which are generally identified at 1312. Although not shown, device 1300 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1300 also includes computer-readable storage media 1314, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1300 can also include a mass storage media device 1316.

Computer-readable storage media 1314 provides data storage mechanisms to store the device data 1304, as well as various device applications 1318 and any other types of information and/or data related to operational aspects of device 1300. For example, an operating system 1320 can be maintained as a computer application with the computer-readable storage media 1314 and executed on processors 1310. The device applications 1318 may include a device manager, such as any form of a control application, software application, signal-processing and control module, code that is native to a particular device, a hardware abstraction layer for a particular device, and so on.

The device applications 1318 also include any system components or modules to implement techniques for arranging tiles. In this example, the device applications 1318 can include windows-based mode module 122, immersive mode module 124, and manager 126.

CONCLUSION

Although embodiments of techniques and apparatuses for arranging tiles have been described in language specific to features and/or methods, the appended claims are not necessarily limited to the specific features or methods described. Rather, the specific features and methods are disclosed as example implementations for arranging tiles.

What is claimed is:

1. A computer-implemented method comprising:
receiving selection, through a single continuous gesture from a user, of a selected tile of multiple tiles displayed in a first view in a user interface, the selection moving the selected tile from a current location among the multiple tiles to a designated region of the user interface including receiving a first dragging portion of the single continuous gesture that drags the selected tile to the designated region,
the designated region being one of a top edge of the user interface, a bottom edge of the user interface, or a marked area within the user interface separated from the multiple tiles, said marked area configured to display tiles at a smaller size than the size at which the multiple tiles are displayed;
responsive solely to the selection moving the selected tile to the designated region and without receiving another gesture from the user, zooming out from the first view to a second view during reception of the single continuous gesture, the second view including at least a portion of the multiple tiles displayed in the first view and multiple other tiles not displayed in the first view;
receiving another selection through the single continuous gesture, the other selection moving the selected tile to a new location in the second view, the other selection including receiving a second dragging portion of the single continuous gesture that drags the selected tile from the designated region to the new location;
zooming into the new location during reception of the single continuous gesture, the zooming in presenting a third view, the third view including the new location and one or more of the multiple other tiles, the new location occupied by a current tile of the multiple other tiles;
indicating that the new location is valid by altering an appearance of a tile above the new location or the current tile;
placing the selected tile at the new location; and automatically reflowing one or more of the multiple other tiles.

2. A computer-implemented method as described in claim 1, wherein tiles of the portion of the multiple tiles included in the second view are presented at a lower resolution or smaller than the tiles of the portion of the multiple tiles when presented in the first view.

3. A computer-implemented method as described in claim 1, wherein the moving the selected tile to the designated region and the moving the selected tile to the new location shows the selected tile connected to a selector of the single continuous gesture.

4. A computer-implemented method as described in claim 1, further comprising receiving a third portion of the single continuous gesture, the third portion a dwell or hover of the single continuous gesture received: over the designated region of the user interface; after the first dragging portion of the single continuous gesture; and before the second dragging portion of the single continuous gesture.

5. A computer-implemented method as described in claim 1, wherein the selection moving the selected tile to the new location in the second view moves the selected tile between the tile above the new location and the current tile.

6. A computer-implemented method as described in claim 1, wherein the selections are received through a touch-sensitive display.

7. A computer-implemented method as described in claim 3, wherein the selector is a mouse pointer.

8. A computer-implemented method as described in claim 1, wherein altering the appearance of the tile above the new location or the current tile tilts the tile above the new location or tilts the current tile.

9. A computer-implemented method as described in claim 1, wherein the selection moving the selected tile to the new location includes a dwell or hover over the new location, and wherein zooming into the new location is responsive to the dwell or the hover.

10. A computer-implemented method as described in claim 1, wherein the user interface, when in the first view, enables selection to launch an application on selection of another of the multiple tiles and, when in the third view and after placing the selected tile at the new location, enables selection to launch another application on selection of one of the multiple other tiles in the third view.

11. A computer-implemented method as described in claim 1, wherein the multiple tiles displayed in the first view are grouped into an array having multiple columns and rows.

12. A computing device comprising: one or more computer processors;
one or more computer-readable media having instructions stored thereon that, responsive to execution by the one or more computer processors, perform operations comprising:
receiving selection, through a single continuous gesture from a user, of a selected tile of multiple tiles displayed in a first view in a user interface, the selection moving the selected tile from a current location among the multiple tiles to a designated region of the user interface including receiving a first dragging portion of the single continuous gesture that drags the selected tile to the designated region, the designated region being one of a top edge of the user interface, a bottom edge of the user interface, or a marked area within the user interface separated from the multiple tiles, said marked area configured to display tiles at a smaller size than the size at which the multiple tiles are displayed;

responsive solely to the selection moving the selected tile to the designated region and without receiving another gesture from the user, zooming out from the first view to a second view during reception of the single continuous gesture, the second view including at least a portion of the multiple tiles displayed in the first view and multiple other tiles not displayed in the first view;

receiving another selection through the single continuous gesture, the other selection moving the selected tile to a new location in the second view, the other selection including receiving a second dragging portion of the single continuous gesture that drags the selected tile from the designated region to the new location;

zooming into the new location during reception of the single continuous gesture, the zooming in presenting a third view, the third view including the new location and one or more of the multiple other tiles, the new location occupied by a current tile of the multiple other tiles;

indicating that the new location is valid by altering an appearance of a tile above the new location or current tile;

placing the selected tile at the new location; and automatically reflowing one or more of the multiple other tiles.

13. A computing device as described in claim 12, wherein tiles of the portion of the multiple tiles included in the second view are presented at a lower resolution or smaller than the tiles of the portion of the multiple tiles when presented in the first view.

14. A computing device as described in claim 12, wherein the moving the selected tile to the designated region and the moving the selected tile to the new location shows the selected tile connected to a selector of the single continuous gesture.

15. A computing device as described in claim 12, further comprising receiving a third portion of the single continuous gesture, the third portion a dwell or hover of the single continuous gesture received: over the designated region of the user interface; after the first dragging portion of the single continuous gesture; and before the second dragging portion of the single continuous gesture.

16. A computing device as described in claim 12, wherein the selection moving the selected tile to the new location in the second view moves the selected tile between the tile above the new location and the current tile or adjacent to the current tile.

17. A computing device as described in claim 12, wherein the selections are received through a touch-sensitive display.

18. A computing device as described in claim 14, wherein the selector is a mouse pointer.

19. A computing device as described in claim 12, wherein altering the appearance of the tile above the new location or the current tile tilts the tile above the new location or tilts the current tile.

20. One or more computer-readable storage memories storing instructions that when executed by a computing device cause the computing device to perform operations comprising:

receiving selection, through a single continuous gesture from a user, of a selected tile of multiple tiles displayed in a first view in a user interface, the selection moving the selected tile from a current location among the multiple tiles to a designated region of the user interface including receiving a first dragging portion of the single continuous gesture that drags the selected tile to the designated region, the designated region being one of a top edge of the user interface, a bottom edge of the user interface, or a marked area within the user interface separated from the multiple tiles, said marked area configured to display tiles at a smaller size than the size at which the multiple tiles are displayed;

responsive solely to the selection moving the selected tile to the designated region and without receiving another gesture from the user, zooming out from the first view to a second view during reception of the single continuous gesture, the second view including at least a portion of the multiple tiles displayed in the first view and multiple other tiles not displayed in the first view;

receiving another selection through the single continuous gesture, the other selection moving the selected tile to a new location in the second view, the other selection including receiving a second dragging portion of the single continuous gesture that drags the selected tile from the designated region to the new location;

zooming into the new location during reception of the single continuous gesture, the zooming in presenting a third view, the third view including the new location and one or more of the multiple other tiles, the new location occupied by a current tile of the multiple other tiles;

indicating that the new location is valid by altering an appearance of a tile above the new location or the current tile;

placing the selected tile at the new location; and automatically reflowing one or more of the multiple other tiles.

* * * * *